United States Patent
Gutmann et al.

(10) Patent No.: US 9,440,354 B2
(45) Date of Patent: Sep. 13, 2016

(54) LOCALIZATION BY LEARNING OF WAVE-SIGNAL DISTRIBUTIONS

(71) Applicant: iRobot Corporation, Bedford, MA (US)

(72) Inventors: Steffen Gutmann, Pasadena, CA (US); Ethan Eade, Pasadena, CA (US); Philip Fong, Pasadena, CA (US); Mario Munich, Sierra Madre, CA (US)

(73) Assignee: iRobot Corporation, Bedford, MA (US)

( * ) Notice: Subject to any disclaimer, the term of this patent is extended or adjusted under 35 U.S.C. 154(b) by 11 days.

(21) Appl. No.: 14/589,429

(22) Filed: Jan. 5, 2015

(65) Prior Publication Data

US 2015/0197011 A1    Jul. 16, 2015

Related U.S. Application Data

(62) Division of application No. 12/940,937, filed on Nov. 5, 2010, now Pat. No. 8,930,023.

(60) Provisional application No. 61/280,677, filed on Nov. 6, 2009.

(51) Int. Cl.
*B25J 9/16* (2006.01)
*G05D 1/02* (2006.01)
(Continued)

(52) U.S. Cl.
CPC ............. *B25J 9/1664* (2013.01); *B25J 9/1694* (2013.01); *G05D 1/0234* (2013.01);
(Continued)

(58) Field of Classification Search
CPC .... B25J 9/1664; B25J 9/1694; B25J 9/1697; B25J 19/021; G05D 1/0234; G05D 1/0272; G05D 1/0274; G05D 1/0261; G05D 1/027; G05D 1/028; G05D 2201/0203; G05D 2201/0206; G05D 2201/0208; G05D 2201/0211; G05D 2201/0215; G05D 1/0246; G05D 1/0255; G05D 1/024; G05D 1/0242; G05D 1/0231; G05D 1/0251; G05D 1/0253; G05D 1/0248; G05D 1/0236; G05D 1/0259; G05D 1/0276; Y10S 901/01; Y10S 901/09; Y10S 901/46

See application file for complete search history.

(56) References Cited

U.S. PATENT DOCUMENTS 4,328,545 A    5/1982  Halsall et al.
4,584,704 A    4/1986  Ferren
(Continued)

FOREIGN PATENT DOCUMENTS

JP    05257527 A    10/1993

OTHER PUBLICATIONS

Gutmann et al., "Challenges of Designing a Low-Cost Indoor Localization System Using Active Beacons," IEEE International Conference on Technologies for Practical Robot Applications (TePRA), IEEE, Apr. 22-23, 2013, Woburn, MA, pp. 1-6.
(Continued)

*Primary Examiner* — Dale Moyer
(74) *Attorney, Agent, or Firm* — Fish & Richardson P.C.

(57) ABSTRACT

A robot having a signal sensor configured to measure a signal, a motion sensor configured to measure a relative change in pose, a local correlation component configured to correlate the signal with the position and/or orientation of the robot in a local region including the robot's current position, and a localization component configured to apply a filter to estimate the position and optionally the orientation of the robot based at least on a location reported by the motion sensor, a signal detected by the signal sensor, and the signal predicted by the local correlation component. The local correlation component and/or the localization component may take into account rotational variability of the signal sensor and other parameters related to time and pose dependent variability in how the signal and motion sensor perform. Each estimated pose may be used to formulate new or updated navigational or operational instructions for the robot.

20 Claims, 27 Drawing Sheets

(51) Int. Cl.
G06F 15/00 (2006.01)
G06F 19/00 (2011.01)

(52) U.S. Cl.
CPC ......... *G05D 1/0272* (2013.01); *G05D 1/0274* (2013.01); *G05D 1/027* (2013.01); *G05D 1/028* (2013.01); *G05D 1/0261* (2013.01); *G05D 2201/0203* (2013.01); *G05D 2201/0206* (2013.01); *G05D 2201/0208* (2013.01); *G05D 2201/0211* (2013.01); *G05D 2201/0215* (2013.01); *Y10S 901/01* (2013.01); *Y10S 901/09* (2013.01); *Y10S 901/46* (2013.01)

(56) References Cited

U.S. PATENT DOCUMENTS

| | | |
|---|---|---|
| 4,626,995 A | 12/1986 | Lofgren et al. |
| 4,628,453 A | 12/1986 | Kamejima et al. |
| 4,638,445 A | 1/1987 | Mattaboni |
| 4,638,446 A | 1/1987 | Palmberg |
| 4,679,152 A | 7/1987 | Perdue |
| 4,691,101 A | 9/1987 | Leonard |
| 4,700,301 A | 10/1987 | Dyke |
| 4,796,198 A | 1/1989 | Boultinghouse et al. |
| 4,817,000 A | 3/1989 | Eberhardt |
| 4,858,132 A | 8/1989 | Holmquist |
| 4,862,047 A | 8/1989 | Suzuki et al. |
| 4,905,151 A | 2/1990 | Weiman et al. |
| 4,918,607 A | 4/1990 | Wible |
| 4,933,864 A | 6/1990 | Evans et al. |
| 4,947,094 A | 8/1990 | Dyer et al. |
| 5,001,635 A | 3/1991 | Yasutomi et al. |
| 5,020,620 A | 6/1991 | Field |
| 5,032,775 A | 7/1991 | Mizuno et al. |
| 5,040,116 A | 8/1991 | Evans et al. |
| 5,051,906 A | 9/1991 | Evans et al. |
| 5,111,401 A | 5/1992 | Everett et al. |
| 5,155,684 A | 10/1992 | Burke et al. |
| 5,165,064 A | 11/1992 | Mattaboni |
| 5,187,662 A | 2/1993 | Kamimura et al. |
| 5,307,271 A | 4/1994 | Everett, Jr. et al. |
| 5,321,614 A | 6/1994 | Ashworth |
| 5,453,931 A | 9/1995 | Watts |
| 5,510,893 A | 4/1996 | Suzuki |
| 5,525,883 A | 6/1996 | Avitzour |
| 5,677,836 A | 10/1997 | Bauer |
| 5,717,484 A | 2/1998 | Hamaguchi et al. |
| 5,770,936 A | 6/1998 | Hirai et al. |
| 5,911,767 A | 6/1999 | Garibotto et al. |
| 5,942,869 A | 8/1999 | Katou et al. |
| 5,995,884 A | 11/1999 | Allen et al. |
| 6,009,359 A | 12/1999 | El-Hakim et al. |
| 6,076,025 A | 6/2000 | Ueno et al. |
| 6,108,076 A | 8/2000 | Hanseder |
| 6,205,380 B1 | 3/2001 | Bauer et al. |
| 6,292,712 B1 | 9/2001 | Bullen |
| 6,339,735 B1 | 1/2002 | Peless et al. |
| 6,370,453 B2 | 4/2002 | Sommer |
| 6,457,206 B1 | 10/2002 | Judson |
| 6,459,955 B1 | 10/2002 | Bartsch et al. |
| 6,493,612 B1 | 12/2002 | Bisset et al. |
| 6,496,754 B2 | 12/2002 | Song et al. |
| 6,496,755 B2 | 12/2002 | Wallach et al. |
| 6,574,536 B1 | 6/2003 | Kawagoe et al. |
| 6,594,844 B2 | 7/2003 | Jones |
| 6,597,076 B2 | 7/2003 | Scheible et al. |
| 6,629,028 B2 | 9/2003 | Paromtchik et al. |
| 6,658,325 B2 | 12/2003 | Zweig |
| 6,677,938 B1 | 1/2004 | Maynard |
| 6,690,134 B1 | 2/2004 | Jones et al. |
| 6,732,826 B2 | 5/2004 | Song et al. |
| 6,809,490 B2 | 10/2004 | Jones et al. |
| 6,830,120 B1 | 12/2004 | Yashima et al. |
| 6,883,201 B2 | 4/2005 | Jones et al. |
| D510,066 S | 9/2005 | Hickey et al. |
| 6,956,348 B2 | 10/2005 | Landry et al. |
| 7,024,278 B2 | 4/2006 | Chiappetta et al. |
| 7,053,578 B2 | 5/2006 | Diehl et al. |
| 7,155,308 B2 | 12/2006 | Jones |
| 7,332,890 B2 | 2/2008 | Cohen et al. |
| 7,706,917 B1 | 4/2010 | Chiappetta et al. |
| 7,720,554 B2 | 5/2010 | DiBernardo et al. |
| 7,805,220 B2 | 9/2010 | Taylor et al. |
| 7,860,680 B2 | 12/2010 | Arms et al. |
| 8,086,419 B2 | 12/2011 | Goncalves et al. |
| 8,087,117 B2 | 1/2012 | Kapoor et al. |
| 8,386,081 B2 | 2/2013 | Landry et al. |
| 8,396,599 B2 | 3/2013 | Matsuo et al. |
| 8,594,840 B1 | 11/2013 | Chiappetta et al. |
| 8,972,052 B2 | 3/2015 | Chiappetta |
| 9,008,835 B2 | 4/2015 | Dubrovsky et al. |
| 2002/0027652 A1 | 3/2002 | Paromtchik et al. |
| 2002/0060542 A1 | 5/2002 | Song et al. |
| 2003/0090522 A1 | 5/2003 | Verhaar |
| 2003/0120389 A1 | 6/2003 | Abramson et al. |
| 2004/0201361 A1 | 10/2004 | Koh et al. |
| 2004/0204792 A1 | 10/2004 | Taylor et al. |
| 2004/0211444 A1 | 10/2004 | Taylor et al. |
| 2004/0220707 A1 | 11/2004 | Pallister |
| 2004/0236468 A1 | 11/2004 | Taylor et al. |
| 2005/0000543 A1 | 1/2005 | Taylor et al. |
| 2005/0171636 A1 | 8/2005 | Tani |
| 2005/0194973 A1 | 9/2005 | Kwon et al. |
| 2005/0204505 A1 | 9/2005 | Kashiwagi |
| 2005/0213082 A1 | 9/2005 | DiBernardo et al. |
| 2005/0213109 A1 | 9/2005 | Schell et al. |
| 2006/0165276 A1* | 7/2006 | Hong .................. G05D 1/0253 382/153 |
| 2006/0293788 A1 | 12/2006 | Pogodin |
| 2007/0061043 A1 | 3/2007 | Ermakov et al. |
| 2007/0106423 A1* | 5/2007 | Myeong ............... G05D 1/027 700/245 |
| 2008/0039974 A1 | 2/2008 | Sandin et al. |
| 2008/0109126 A1 | 5/2008 | Sandin et al. |
| 2008/0266748 A1 | 10/2008 | Lee |
| 2009/0102296 A1 | 4/2009 | Greene |
| 2010/0001991 A1 | 1/2010 | Jeong et al. |
| 2010/0082193 A1 | 4/2010 | Chiappetta |
| 2010/0110412 A1* | 5/2010 | Basu ................... G01C 15/002 356/3 |
| 2010/0274387 A1 | 10/2010 | Pitzer |
| 2010/0315288 A1* | 12/2010 | Liu ....................... H04B 7/086 342/359 |
| 2011/0054689 A1* | 3/2011 | Nielsen ................ G05D 1/0088 700/258 |
| 2012/0213443 A1* | 8/2012 | Shin ..................... G05D 1/0246 382/190 |
| 2012/0219207 A1* | 8/2012 | Shin ....................... B25J 9/162 382/153 |
| 2013/0245937 A1 | 9/2013 | DiBernardo et al. |

OTHER PUBLICATIONS

Gutmann et al., "A Constant-Time Algorithm for Vector Field SLAM Using Exactly Sparse Extended Information Filter," In Proc. Robotics: Science and Systems, 2010, 8 pages.
Gutmann et al., "Vector Field SLAM," IEEE International Conference on Robotics and Automation (ICRA), IEEE, 2010, pp. 236-242.
Goel et al., "Systematic Floor Coverage of Unknown Environments Using Rectangular Regions and Localization Certainty," IEEE/RSJ International Conference on Intelligent Robots and Systems (IROS), IEEE, Nov. 3-7, 2013, Tokyo, Japan, pp. 1-8.
Andersen et al., "Landmark based navigation strategies," SPIE Conference on Mobile Robots XIII, SPIE vol. 3525, Jan. 1999, pp. 170-181.
Barker, "Navigation by the Stars—Ben Barker 4th Year Project," Nov. 2004, 20 pages.
Bison et al., "Using a structured beacon for cooperative position estimation," Robotics and Autonomous Systems, 29 (1):33-40, Oct. 1999.
Chae et al., "StarLITE: A new artificial landmark for the navigation of mobile robots," http://www.irc.atr.jp/jk-nrs2005/pdf/Starlite.pdf, 2005, 4 pages.

(56) References Cited

OTHER PUBLICATIONS

Chamberlin et al., "Team 1: Robot Locator Beacon System, " NASA Goddard SFC, Design Proposal, Feb. 2006, 15 pages.

Eren et al., "Accuracy in position estimation of mobile robots based on coded infrared signal transmission," Proceedings: Integrating Intelligent Instrumentation and Control, Instrumentation and Measurement Technology Conference, 1995, IMTC/95., 1995, pp. 548-551.

Evolution Robotics, "NorthStar—Low-cost Indoor Localiztion—How it Works," E Evolution Robotics, 2005, 2 pages.

Facchinetti Claudio et al., "Self-Positioning Robot Navigation Using Ceiling Images Sequences," ACCV '95, Dec. 1995, 5 pages.

Fukuda et al., "Navigation System based on Ceiling Landmark Recognition for Autonomous mobile robot," 1995 IEEE/RSJ International Conference on Intelligent Robots and Systems 95. 'Human Robot Interaction and Cooperative Robots', Pittsburgh, PA, Aug. 1995, pp. 1466-1471.

Goncalves et al., "A Visual Front-End for Simultaneous Localization and Mapping," Proceedings of the 2005 IEEE International Conference on Robotics and Automation, Barcelona, Spain, Apr. 2005, pp. 44-49.

Karlsson et al., "The vSLAM Algorithm for Robust Localization and Mapping," Proceedings of the 2005 IEEE International Conference on Robotics and Automation, Barcelona, Spain, Apr. 2005, pp. 24-29.

Lang et al., "Visual Measurement of Orientation Using Ceiling Features", 1994 IEEE, 1994, pp. 552-555.

Linde, Dissertation—"On Aspects of Indoor Localization," Available at: https://eldorado.tu-dortmund.de/handle/2003/22854, University of Dortmund, Aug. 2006, 138 pages.

Ma, Thesis—"Documentation on Northstar," California Institute of Technology, May 2006, 15 pages.

Martishevcky, "The Accuracy of point light target coordinate determination by dissectoral tracking system", SPIE vol. 2591, Oct. 2005, pp. 25-30.

McGillem,et al. "A Beacon Navigation Method for Autonomous Vehicles," IEEE Transactions on Vehicular Technology, Aug. 1989, 38(3):132-139.

McGillem et al., "Infra-red Lacation System for Navigation and Autonomous Vehicles," 1988 IEEE International Conference on Robotics and Automation, Apr. 1988, vol. 2, pp. 1236-1238.

Munich et al., "SIFT-ing Through Features with ViPR," IEEE Robotics & Automation Magazine, Sep. 2006, pp. 72-77.

Paromtchik et al., "Optical Guidance System for Multiple mobile Robots," Proceedings 2001 ICRA. IEEE International Conference on Robotics and Automation, May 2001, vol. 3, pp. 2935-2940.

Paromtchik "Toward Optical Guidance of Mobile Robots," Proceedings of the Fourth World Multiconference on Systemics, Cybermetics and Informatics, Orlando, FL, USA, Jul. 23, 2000, vol. IX, pp. 44-49, available at http://emotion.inrialpes.fr/~paromt/infos/papers/paromtchik:asama:sci:2000.ps.gz, accessed Jul. 3, 2012, 6 pages.

Pirjanian, "Challenges for Standards for consumer Robotics," IEEE Workshop on Advanced Robotics and its Social impacts, Jun. 2005, pp. 260-264.

Pirjanian et al., "A decision-theoretic approach to fuzzy behavior coordination," 1999 IEEE International Symposium on Computational Intelligence in Robotics and Automation, 1999. CIRA '99., Monterey, CA, Nov. 1999, pp. 101-106.

Pirjanian et al., "Distributed Control for a Modular, Reconfigurable Cliff Robot," Proceedings of the 2002 IEEE International Conference on Robotics & Automation, Washington, D.C. May 2002, pp. 4083-4088.

Pirjanian et al., "Improving Task Reliability by Fusion of Redundant Homogeneous Modules Using Voting Schemes," Proceedings of the 1997 IEEE International Conference on Robotics and Automation, Albuquerque, NM, Apr. 1997, pp. 425-430.

Pirjanian et al., "Multi-Robot Target Acquisition using Multiple Objective Behavior Coordination," Proceedings of the 2000 IEEE International Conference on Robotics & Automation, San Francisco, CA, Apr. 2000, pp. 2696-2702.

Pirjanian, "Reliable Reaction," Proceedings of the 1996 IEEE/SICE/RSJ International Conference on Multisensor Fusion and Integration for Intelligent Systems, 1996, pp. 158-165.

Pirjanian et al. "Representation and Execution of Plan Sequences for Multi-Agent Systems," Proceedings of the 2001 IEEE/RSJ International Conference on Intelligent Robots and Systems, Maui, Hawaii, Oct. 2001, pp. 2117-2123.

Rives et al., "Visual servoing based on ellipse features," SPIE, vol. 2056 Intelligent Robots and Computer Vision, 1993, pp. 356-367.

Salomon et al., "Low-Cost Optical Indoor Localization system for Mobile Objects without Image Processing," IEEE Conference on Emerging Technologies and Factory Automation, 2006. (ETFA '06), Sep. 2006, pp. 629-632.

Sato, "Range Imaging Based on Moving Pattern Light and Spatio-Temporal Matched Filter," Proceedings International Conference on Image Processing, vol. 1., Lausanne, Switzerland, Sep. 1996, pp. 33-36.

Thrun, Sebastian, "Learning Occupancy Grid Maps With Forward Sensor Models," Autonomous Robots 15, Sep. 2003, 28 pages.

Yun et al., "Image-Based Absolute Positioning System for Mobile Robot Navigation," IAPR International Workshops SSPR, Hong Kong, Aug. 2006, pp. 261-269.

\* cited by examiner $x_0$ $\quad$ c $\quad$ $m_1$ $\quad$ $m_2$ $\quad$ $m_3$ $\quad$ $m_4$

LOCALIZATION BY LEARNING OF WAVE-SIGNAL DISTRIBUTIONS

CROSS-REFERENCE TO RELATED APPLICATIONS

This application is a continuation of and claims priority to U.S. application Ser. No. 12/940,937, filed Nov. 5, 2010, which claims the benefit under 35 U.S.C. §119(e) of U.S. Provisional Application No. 61/280,677, filed Nov. 6, 2009, the entirety of which is hereby incorporated by reference.

BACKGROUND

1. Field of Endeavor

What is disclosed herein relates to determining the position and orientation of an object.

2. Description of the Related Art

It is often necessary or useful to be able to determine the pose (location and orientation) of an object, person, pet, asset or device. Certain systems for determining the pose of an object equipped with a signal sensor are known. However, many mobile devices lack the resources necessary to run known systems themselves or are unable to implement them while performing additional tasks, and many such systems fail to effectively take into account practical issues such as manufacturing and production variances, variability of the surfaces of the area in which a mobile device operates (such as uneven terrain or floors), and complications resulting from signal interaction with environmental features such as walls or trees.

SUMMARY

Certain embodiments discussed in this application may be utilized in conjunction with systems and methods disclosed in U.S. Pat. No. 7,720,554, filed on Mar. 25, 2005, the content of which is hereby incorporated herein in its entirety by reference.

A method for accurately estimating the pose of a mobile object in an environment, without an a priori map of that environment, is disclosed. The method generates the estimates in near real-time, compensates for the rotational variability of a signal sensor, compensates for signal multipath effects, and is statistically more accurate than relying on dead reckoning or signal detection alone. The method comprises decomposing an environment to be navigated by the mobile object into two or more cells, each of which is defined by three or more nodes. An expected measure of a background signal is determined for each of the nodes, and an expected measure of the signal at positions interior to the cell is estimated based on the expected measure at each of two or more of the cell's nodes. The actual or expected measures at the nodes need not be known a priori, because as the mobile object navigates the environment, the mobile object maps the signal measure at substantially the same time as it localizes by using, for example, an appropriate implementation of an appropriate SLAM algorithm. During an initialization process, initial values for some or all of the calibration parameters including but not limited to the rotational variability, sensor error, and the like, are optionally determined. Also obtained is a scale parameter that correlates a position or location to an expected signal measure. The initialization process makes use of data from the signal sensor as well as a motion sensor and allows for initial determination of an expected signal measure at each of the nodes of a cell. During the SLAM phase, the pose of the mobile object is estimated based on some or all of the following: data from the motion sensor, data from the signal sensor, a map of expected signal measures, the calibration parameters, and previous values for these items. If the mobile object leaves a cell defined by initialized nodes, then the initialization process may be rerun to initialize any previously uninitialized nodes of the cell the mobile object enters. Optionally, some or all of the uninitialized nodes of the cell the mobile object enters are initialized by extrapolating from nodes of cells neighboring the entered cell.

Also disclosed is a method for accurately estimating the pose of a mobile object in an environment, without an a priori map of that environment, which estimates the pose in near real-time, compensates for signal multipath effects, and is statistically more accurate than relying on dead reckoning or signal detection alone. The method comprises decomposing an environment to be navigated by the mobile object into two or more cells, each of which is defined by three or more nodes. An expected measure of a background signal is determined for each of the nodes, and the expected measure of the signal at positions proximate to those nodes is estimated based on the expected measure at each of two or more of the cell's nodes. The actual or expected measures at the nodes need not be known a priori, because as the mobile object navigates the environment, the mobile object maps the signal measure at substantially the same time as it localizes by using, for example, an appropriate implementation of an appropriate SLAM algorithm.

During an initialization process, initial values for some or all of the calibration parameters, including but not limited to rotational variability, sensor error, and the like, are optionally determined. Also obtained is a scale parameter that correlates a position to an expected signal measure. The scale parameter may become less accurate for positions (locations) not proximate to the cell or the nodes of the cell. The initialization process makes use of data from the signal sensor as well as a motion sensor and allows for initial determination of the expected signal measure at each of the nodes of a cell.

During the SLAM phase, the pose of the mobile object is estimated based on some or all of the following: data from the motion sensor, data from the signal sensor, the map of expected signal measures, the calibration parameters, and previous values for these items. If the mobile object moves or is moved so that it is not proximate to the nodes or to an earlier position, then the initialization process may be rerun to initialize any previously uninitialized nodes of the cell the mobile object enters. Optionally, some or all of the uninitialized nodes proximate to the mobile object's new position are initialized by extrapolating from previously estimated values associated with positions proximate to the uninitialized nodes.

"Proximate" is a broad term and is to be given its ordinary and customary meaning to a person of ordinary skill in the art (i.e., it is not to be limited to a special or customized meaning) and includes, without limitation, being less than 0.25 meters, 0.5 meters, 1 meter, 5 mobile device lengths, or less than 10 mobile device lengths apart. In some embodiments, proximate may be defined relative to the size of an environment if a measure of that size is obtained (e.g., 10% or 5% of environment width). In some embodiments, proximate may be defined relative to the mobile device (e.g., the distance traveled by the mobile device in 0.5 seconds or 1 second). Poses may be proximate if their locations are proximate. Orientations may also be proximate. For example, two poses may be proximate if they differ by less than a particular amount, such as but not limited to 1, 2, 5, or 10 degrees. In some embodiments, two poses are proximate if both their locations and orientations are proximate. In other embodiments, only the locations of the poses are considered. A pose may be proximate to a location or position.

BRIEF DESCRIPTION OF THE DRAWINGS

The disclosed aspects will hereinafter be described in conjunction with the appended drawings, which are provided to illustrate and not to limit the disclosed aspects. Like designations denote like elements.

Figure 20:
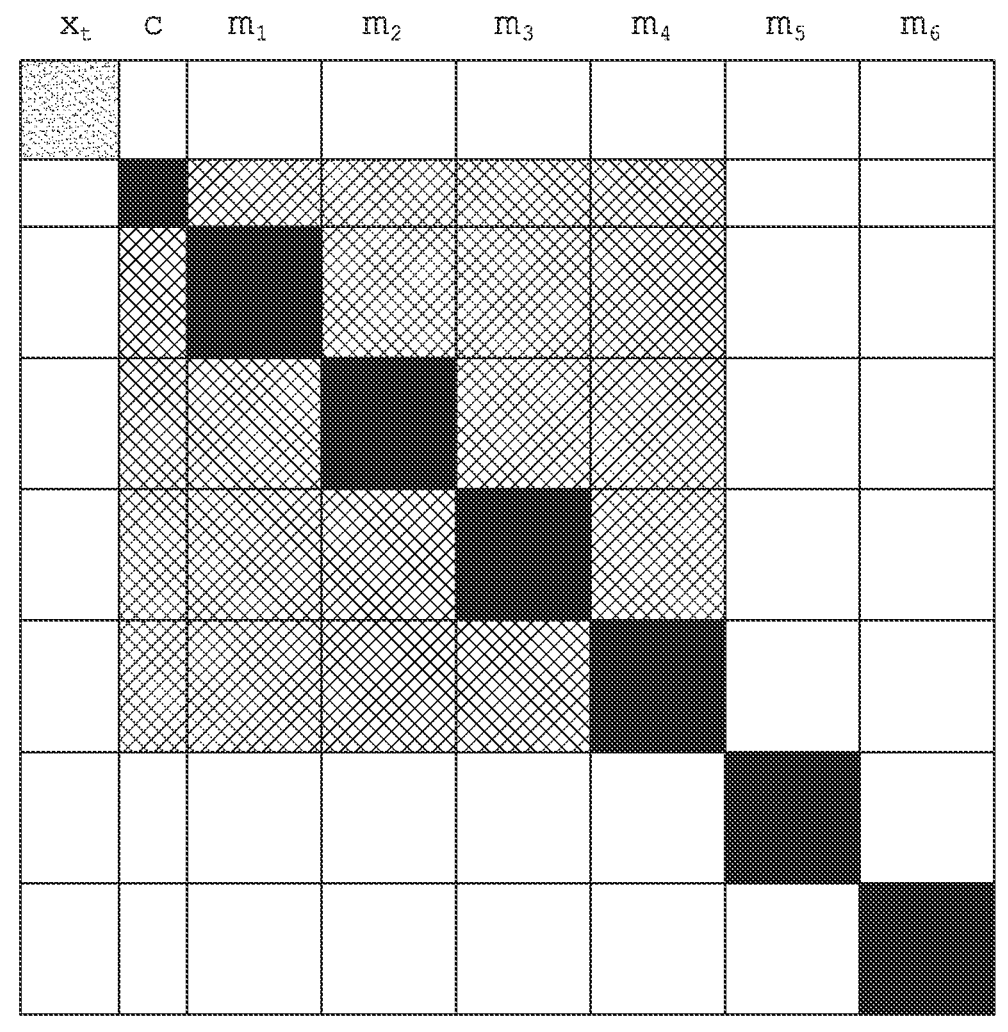

FIGS. 16-22 illustrate an example development of an information matrix in an embodiment using EKF SLAM for localization.

DETAILED DESCRIPTION OF PREFERRED EMBODIMENTS

Figure 1:
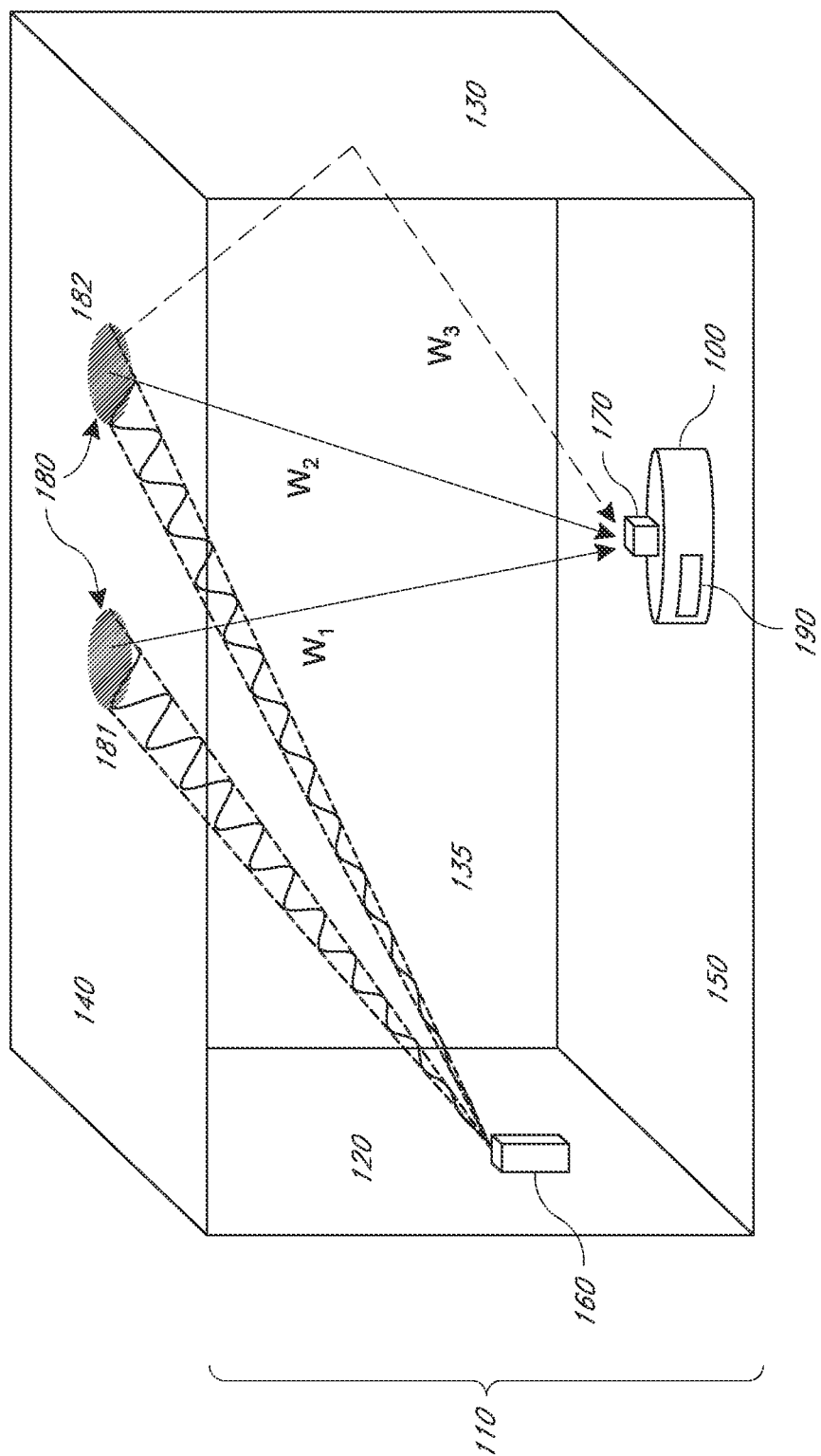
FIG. 1 illustrates an example embodiment of a mobile device configured to learn signal distributions for use in localizing and navigating an environment.

Described herein are methods and systems for the localization of an object, such as a mobile object (e.g., a robotic floor cleaner). Certain embodiments may utilize such mobile object localization to navigate the mobile object. By way of illustration and not limitation, the mobile object may optionally be an autonomous, semiautonomous, or remotely directed floor cleaner (e.g., a sweeper, a vacuum, and/or a mopper), delivery vehicle (e.g., that delivers mail in a building, food in a hospital or dormitory, etc.), or monitoring vehicle (e.g., pollution or contaminant detector, security monitor), equipped with one or more drive motors which drive one or more wheels, tracks, or other such device, where the drive motors may be under control of a computing device executing a program stored in non-transitory memory (e.g., it persists when the object is powered down or when some other data is overwritten or erased).

Example embodiments will now be described with reference to certain figures. Through the description herein, "localization" may include determining both the position of an object in an environment and the orientation of that object. The combination of position and orientation is referred to as the "pose". Either or both of the position (or location) and orientation may be absolute (in terms of a logical reference angle and origin) or relative (to another object).

Many objects, including mobile objects, are not functionally or physically symmetrical. Knowing the orientation of such objects may be useful in determining how to navigate such objects in an environment. For example, some mobile objects can only move forward and some mobile objects may have functional components, such as vacuum ports or sweepers, at specific locations on their surface. Also, the current orientation of a mobile object may affect its future position as much as its current position does if it moves in the direction of its orientation. Thus, determining the pose of a mobile object may be of great assistance in determining how to navigate the mobile object to perform a task, such as a floor cleaning task, in an efficient manner.

For convenience, much of this disclosure is expressed in terms of localizing a "mobile device". However, the disclosed aspects may generally be used to localize types of objects, and one of skill in the art will understand how the disclosure can be applied to objects that are not independently mobile (such as those that are transported or carried by something else) and to objects that are not devices (e.g., pets equipped with collars or humans carrying appropriately configured tags or computing devices).

Typically, when performing tasks such as vacuum cleaning, lawn mowing, delivery, elderly care, etc., an autonomous or mobile device needs to know its pose with respect to its environment in order to reach its goal or accomplish its task in an effective way. For example, toys and other devices might be intended and configured to behave in a particular manner when they are in a particular location. Even if the device itself has no additional task or goal that benefits from localization, if its pose can be determined then the location of a person or other entity carrying or otherwise attached to the device can be determined. If the relative orientations of the carrier and the device are known, then the pose of the carrier can be determined.

The methods and systems disclosed herein advance the state of the art in how the pose of an autonomous device is computed from a combination of observations of a vector field that varies over space and measurements from motion sensors such as odometers, gyroscopes, accelerometers, internal measurement units (IMU) or other dead-reckoning devices (generically referred to as "dead-reckoning sensors" and the output of which is generically referred to as "odometry" or "motion measurements"). Measurements (e.g., measurements of change in position or orientation) from a motion sensor may be relative to another position or may be absolute. Such measurements may include measures of location or distance (e.g., distance or direction of travel) as well as measures of object orientation (e.g., amount of rotation from a previous orientation or amount of rotation from an absolute reference). Wave or other signals emitted into an environment by an external source can create an appropriate vector field. Example methods and systems disclosed herein use a localization and mapping technique, such as a simultaneous (which may be substantially simultaneous) localization and mapping (SLAM) framework, for estimating object pose, parameters modeling rotational variability, and parameters describing the signal distribution or vector field in the environment.

Example embodiments incorporating certain disclosed aspects can localize and track a mobile device with higher accuracy than conventional methods that ignore complications such as rotational variability or multi-path effects. Some embodiments do so in a way that requires no a priori map of the environment or of the signal strength in that environment. Some disclosed embodiments can optionally do so while using relatively inexpensive amounts of computational resources such as processing power, storage, and time, such that the functionality disclosed herein can be made available in a relatively compact mobile device and/or it can be distributed in affordable mass market consumer goods, including products which perform additional functionality beyond localizing, mapping, or navigating. Pose estimates can be obtained in near real time in some such embodiments and some embodiments run in constant or substantially constant time, with storage requirements linear or near linear based on the size of the environment for a given node size (i.e., for a given node size, it is linear in the number of nodes).

FIG. 1 illustrates an example context or environment in which an object 100 such as a mobile device may be situated. The environment 110 in this example includes left wall 120, right wall 130, front wall 135, ceiling 140, and floor or ground 150. One or more signal sources 180 generate background wave signals—the aforementioned vector field. The mobile device 100 includes a signal detector 170 configured to detect the signals generated by the sources 180 and a dead-reckoning (motion) sensor 190 to report on observed motion.

U.S. Pat. No. 7,720,554 discloses, among other things, a low-cost optical sensing system for indoor localization. A beacon 160 projects a pair of unique infrared patterns or spots 180 on the ceiling 140. The beacon 160 can be placed relatively freely in the environment 110 and adjusted such that it points towards the ceiling 140. An optical signal sensor 170 measures the direction to both spots 180 on the ceiling 140. The signal sensor 170 then reports the coordinates of both direction vectors projected onto the sensor plane. These beacon spots 180 are the signal sources in an example embodiment that is used throughout this disclosure. Other embodiments may use more or fewer spots 180. Other wave signals such as those used in Wi-Fi, GPS, cellular networks, magnetic fields, sound waves, radio-frequency identification (RFID), or light can also be used. Corresponding sources include wireless routers, satellites, cell towers, coils, speakers, RFID transmitters, and projectors. For example, appropriately configured ceiling lights or speakers may be used in certain embodiments. Although the illustrated embodiment uses a dedicated projector 160 to generate the signal sources 180, in other embodiments pre-existing or off-the-shelf generators can be used. For example, in an apartment complex or a yard, a detector 170 may be configured to take advantage of the distinct Wi-Fi signals available from the various Wi-Fi routers that may be within range. Similarly, existing lights, including fixed ceiling lights, may be used with photo-sensitive sensors. Other signal sources may generate soundwaves (audible, subsonic, or ultrasonic) and the detector 170 may be configured to detect the generated waves. Thus, no or minimal modification to the environment is necessary for such embodiments to be effective. Digital signals, including those transmitted by radio and/or as used in wireless communications may also be used.

Because an indoor embodiment is used to illustrate many of the disclosed aspects, those aspects are disclosed in the context of an indoor environment. However, the disclosed aspects are not limited in this way and can operate outdoors as well as indoors.

A system that tracks the pose of a mobile device 100 equipped with a signal sensor 170 by relying, even in part, on the values reported by that sensor 170 faces a number of challenges. Typically, the signals sensed by the sensor 170 will have a different strength or value at different locations in the environment. In the illustrated scenario, the mobile device 100 moves along the ground 150 (although one of skill could readily apply what is disclosed to a mobile device that travels along a wall or ceiling, or that moves (and rotates) in three dimensions). One challenge is relating a change in the detected (sensed) signal to a change in ground position. The relationship between sensed signal and ground position is the "scale" parameter.

Another challenge stems from the construction, manufacture, or assembly of the sensor 170, performance properties of the second 170, and/or its association with or coupling to the mobile device 100. In some embodiments the orientation of the sensor 170 is fixed relative to the environment 110 and is independent of the rotation of the mobile device 100. For example, a gyroscopic or inertial system may be used to rotatably attach the sensor 170 to the mobile device 100 such that when the mobile device turns or rotates, the sensor rotates in a counter direction. In other embodiments the sensor 170 is rigidly affixed to or integrated with the mobile device 100 such that its orientation is substantially fixed relative to the orientation of the mobile device 100. Indeed, in this disclosure the position and orientation of the sensor 170 are presumed to be identical to that of the mobile device 100 so that, for example, "sensor 170" is used interchangeably with "device 100" when discussing pose or motion. As discussed below, this assumption simplifies the disclosure. One of reasonable skill can readily account for any fixed or calculable offset between the orientation of the sensor 170 and the device 100.

Ideally, rotation of the sensor 170 relative to the environment 110 should not affect the detected signal or should affect it in a way that depends only on the degree of rotation. For example, the direction to signal sources 180 changes when rotating the sensor 170, but the magnitude of the signal at that position is not changed. However, some sensors have directional sensitivities. For example, a Wi-Fi receiver can show changes in signal strength when the antenna is rotating as a result of the device on which it is mounted (e.g., the mobile device) rotating. Even in such a situation, the variation might be predictable and calculable. However, errors in manufacturing, misalignments in attaching the sensor on the object, uneven flooring, and the like may introduce an additional, difficult to predict, variation in the orientation of the signal sensor 170 relative to the orientation of the device 100. This may lead to seemingly unpredictable variation in the signal strength detected by the sensor 170. Thus, for example, a sensor 170 measuring bearing and elevation relative to sources 180 can show variations due to calibration errors of the sensor's vertical axis. This parameter is referred to herein as "rotational variability".

A third challenge in determining the pose of a mobile device arises from the multiple paths from the signal sources 180 to the sensor 170. In general, a sensor 170 may receive a wave signal not only directly from a source 180 but also through reflections on walls 120, 130, 135 and other stationary and non-stationary objects in the environment (e.g., furniture, trees, and humans). The direct path as well as each reflection may contribute to the signal measured on the sensor 170. This can create non-linear and seemingly arbitrary distributions of the signal throughout the environment 110. This effect is referred to herein "multi-path".

Some embodiments of the methods and systems disclosed are configured to operate when some or all of the following conditions are met:

First, a given signal can be uniquely identified relative to other signals so that when a signal is detected at different times in an environment 110 with multiple signals, a correspondence between the signals can be maintained. For example, signals in Wi-Fi, GPS and other networks contain a unique ID as part of their data packet protocol. Active beacons, such as those disclosed in U.S. Pat. No. 7,720,554, may encode a signature (e.g., by modulating the signal, such as by modulating a light that forms light spots on a ceiling).

Second, signals are substantially continuous and change over space but optionally not in time. It should be understood that continuity does not mean that there is necessarily a one-to-one correspondence of vector of signal values to ground positions. The same measurement vector might be observed at several different locations in the environment 110 because, for example, of multi-path. Some embodiments may operate with signals that change in time, where the change over time is known or can be predicted.

Third, a dependency on orientation can by described by signal sensor orientation and rotational variability. In other words, knowing the signal values at one pose (position and orientation) enables expected signal values for other orientations at the same position to be calculated if the change in sensor orientation and any rotational variability are known.

Figure 2:
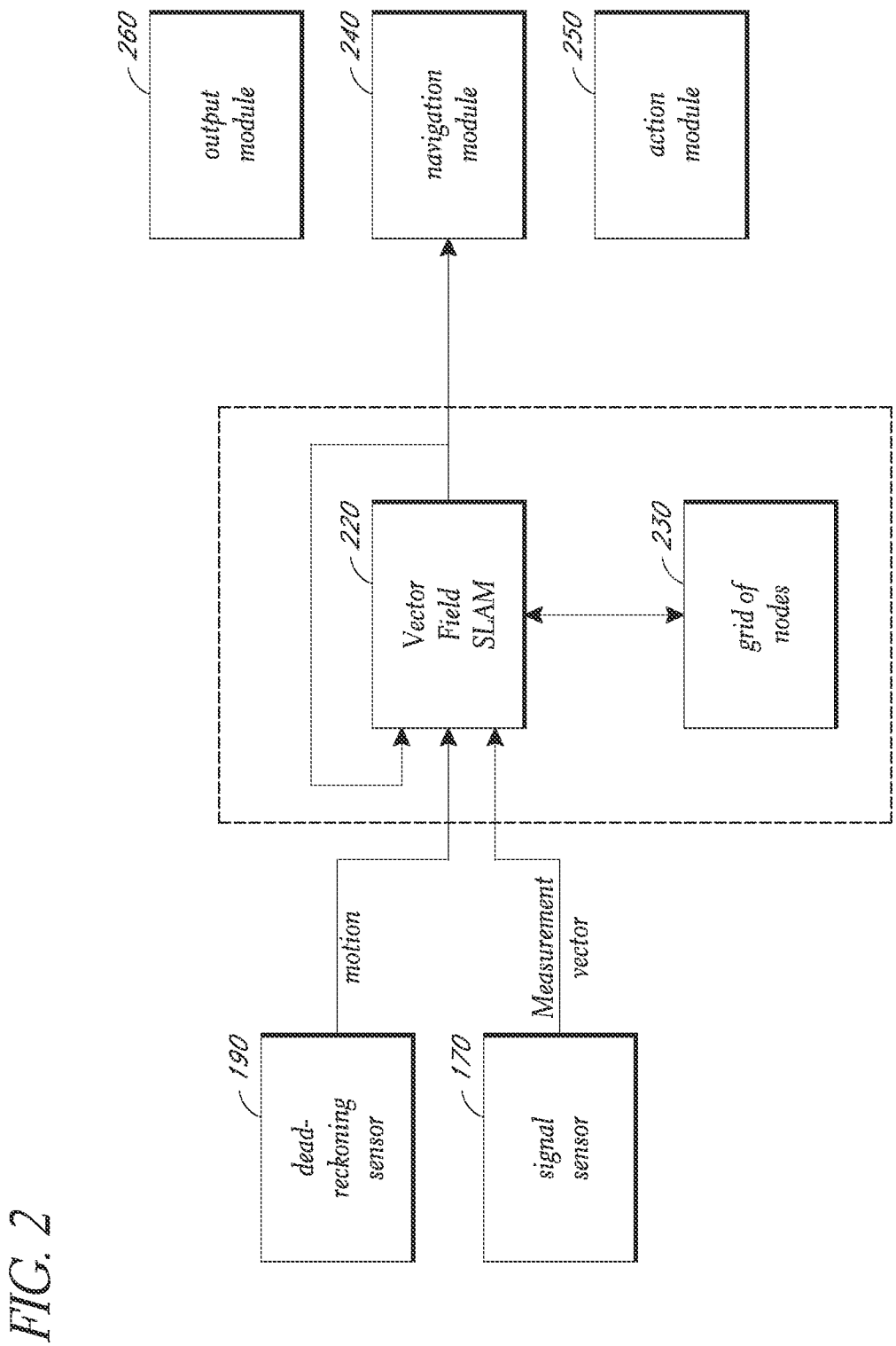
FIG. 2 is a functional logical diagram illustrating example functional elements of an embodiment of such a mobile device.

FIG. 2 illustrates an example functional block diagram of an embodiment of a localization system. A dead reckoning sensor 190 provides relative motion data (odometry). Information from the dead reckoning sensor may be used to estimate, in whole or in part, the device's current position based upon a previously determined position and advancing that position using a known or estimated speed over an elapsed period of time.

The dead reckoning (motion) sensor 190 may include multiple instances of multiple types of dead reckoning sensors such as those mentioned above. A signal sensor 170 provides measurement vectors of the signals in the environment. The signal sensor 170 may include multiple instances of one or more types of sensing components. In some embodiments the signal sensor 170 may include one or more sensors which detect more than one different types of signals (e.g., the signal sensor 170 may include both Wi-Fi sensors and light sensors). Some such embodiments may use only one signal type at a time; some such embodiments may normalize the output of the signal sensor and proceed as if there were only one type of (composite) signal being sensed; and some embodiments may extend what is disclosed below in obvious ways by using the availability of more signal sensor data to improve the filtering results.

The output of sensors 170, 190 are provided to a Vector Field SLAM module 220. The illustrated SLAM module 220 reads and stores information 230 about a grid of nodes. The SLAM module 220 also provides pose estimates of the mobile device 100 and map information about the signal distribution in the environment 110. These may be provided to other components for use and/or display. For example, pose estimates may be provided to a navigational component 240, which directs the mobile device 100 to move to a new location based at least in part on its current pose. They may also be provided to an alerting or action system 250 which uses the current pose as at least a partial basis for subsequent action such as cleaning. The map may be stored for future use and/or displayed for diagnostic purposes, for example.

Even though many appropriate signal sources may be present or could be made available, and although appropriate signal sensors may be configured on an embodiment, some embodiments will optionally not use GPS, not use WiFi, not use direct light signals (e.g., non-reflected light from lamps or infrared sources), and/or not make use of ceiling lighting fixtures for some or all aspects of the localization process.

Figure 3:
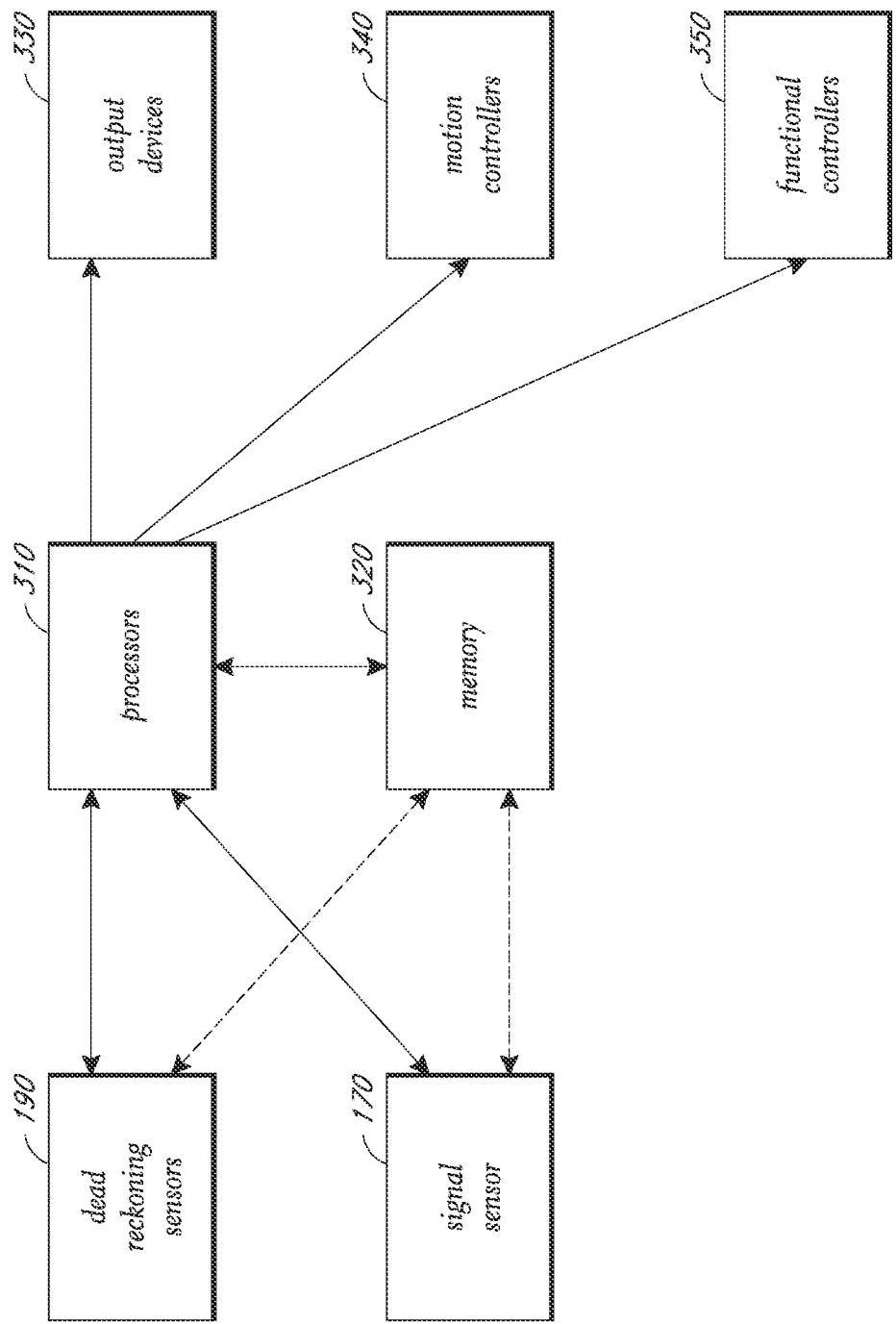
FIG. 3 illustrates an example physical architecture of an embodiment of such a mobile device.

FIG. 3 illustrates example physical components of an appropriately configured example device 100. The dead reckoning sensors 190 and signal sensors 170 are instantiated by components such as those described above. Those physical sensors may include their own processors and/or local storage components and may be configured to normalize data and generate standardized output signals. The sensor components may communicate with one or more processors 310. The processor may be, for example, a specially configured chip or a more general processor executing software. Regardless, it is configured in accordance with what is disclosed herein. The processor may include its own storage, but it may be advantageous for the device 100 to include additional memory or storage 320 to store any necessary software and the data necessary to implement the methods disclosed below. In some embodiments the sensors may also store data directly in the memory 320. Software for implementing aspects of what is disclosed would typically be stored in ROM, flash memory, or some other form of persistent storage, although volatile storage may be used as well. Data may be stored in volatile (e.g., can be erased when the system powers down) and/or non-volatile memory (which stores the data for later access even if the device is powered down and then powered up again). The processor 310 and storage 320 may also be used for functional purposes not directly related to localization. For example, the mobile device 100 may use them when performing navigation or when performing tasks such as cleaning or guarding. In other embodiments, the processing and storage capacity are dedicated to localization and mapping and the device contains additional computational capacity for other tasks.

The processor 310 may be operatively connected to various output mechanisms such as screens or displays, light and sound systems, and data output devices (e.g., busses, ports, and wireless or wired network connections). The processor may be configured to perform navigational routines which take into account the results of the SLAM process. Executing a navigational process may result in signals being sent to various controllers such as motors (including drive motors or servomotors), brakes, actuators, etc, which may cause the mobile device 100 to move to a new pose (or to perform another activity, such as a cleaning function). The move to this new pose may, in turn, trigger additional output from the sensors to the processor, causing the cycle to continue. An example embodiment is configured with an ARM7 processor, 256K of flash ROM for software, and 64K of RAM for data. These are not minimum requirements—some or all of what is disclosed herein can be accomplished with less processing and storage capacity. Other embodiments may be different processors and different memory configurations, with larger or smaller amounts of memory.

Turning back to FIG. 1, the signal sensor 170 measures bearing and elevation to two or more of the projected spots 180 on the ceiling 140. Bearing and elevation can be translated into (x, y) coordinates in a sensor coordinate system by projecting them onto the sensor plane, which in the illustrated example embodiment is typically less than 10 cm above the ground 150 and is substantially parallel to it. In addition to the signal coordinates, the amount of light from each spot 180 is measured as the signal magnitude.

Figure 4:
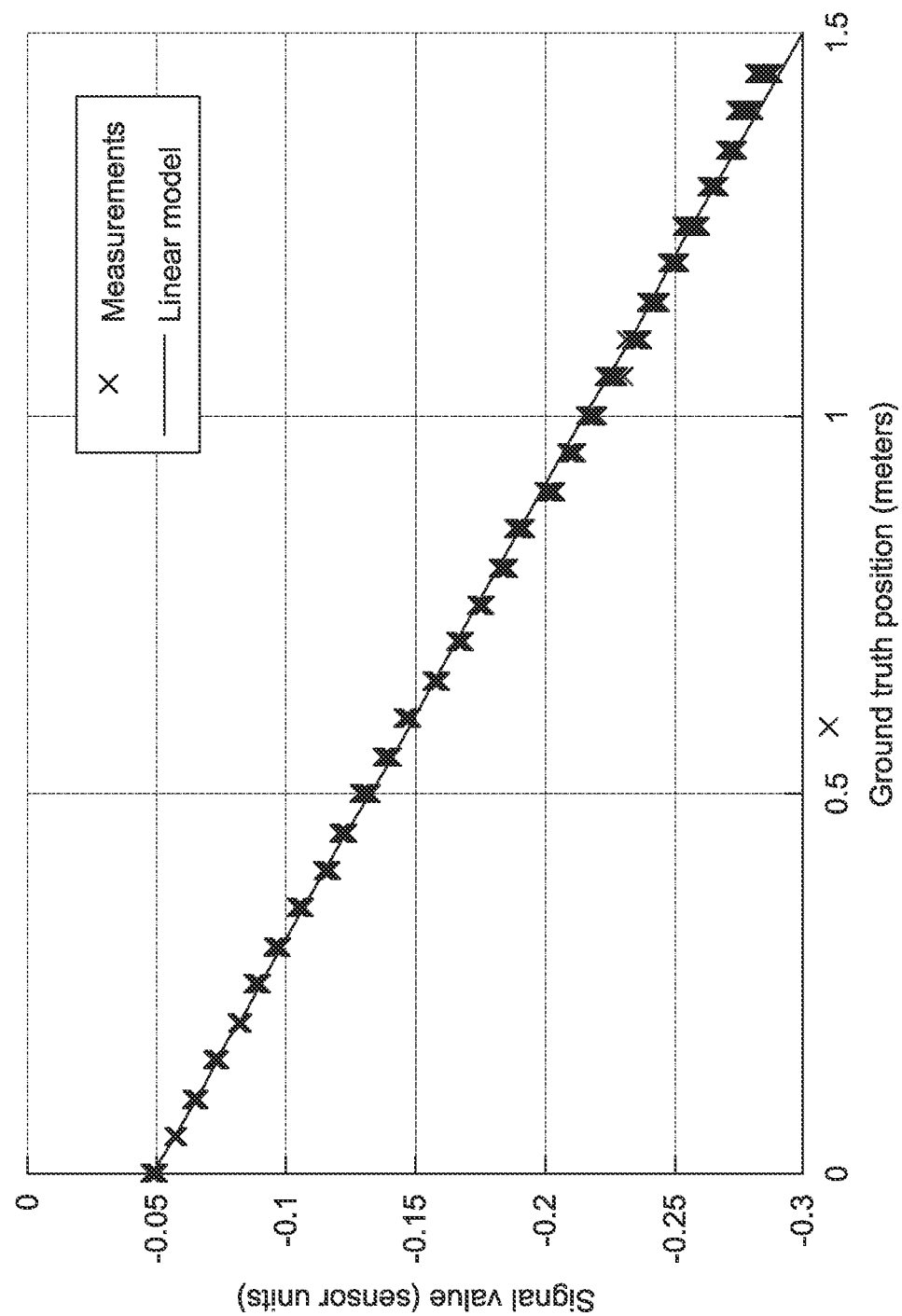
FIG. 4 illustrates a linear relationship between the actual ("truth") ground position of a mobile device and the output of a sensor detecting signals at that ground position.

The geometry of the illustrated localization system results in a linear model for position estimation in an ideal environment without multi-path signals. That is, if the sensor 170 moves one meter in one direction, the sensor coordinates change by a certain amount (depending on the scale parameter, which is proportional to the height of the ceiling 140). If the sensor 170 then moves another meter into the same direction, the sensed signals change by the same amount. FIG. 4 illustrates this property by using measurements of a sensor 170 mounted on a fixed path (or "rail") along which the sensor 170 moves in a fixed and known direction. The rail is an experimental platform for evaluating the systems and methods described herein which allows the ground position of the sensor 170 to be known to observers and which also allows the orientation of the sensor 170 to be controlled. On the x-axis the position on the rail is shown. The y-axis shows the y coordinate of one of the spots 180 in sensor units.

In situations such as that shown in FIG. 4, the linear distribution of the wave signal can be used directly for the localization of the sensor 170 in conjunction with other system parameters. For example, in the embodiment illustrated in FIG. 1 with two spots 180, these parameters could be chosen as per Equation (1), where $s_1$ and $s_2$ are scale factors for each spot 180 and $m_0 = (m_{0,x1}\ m_{0,y1}\ m_{0,x2}\ m_{0,y2})^T$ contains absolute offsets $(m_{0,x1}\ m_{0,y1})^T$ for the first spot 181 and $(m_{0,x2}\ m_{0,y2})^T$ for the second spot 182.

$$v_{init} = (s_1, s_2, m_0) \quad (1)$$

From these parameters, an expected signal value $h = (h_{x1}, h_{y1}, h_{x2}, h_{y2})^T$ at a sensor position $(x\ y)^T$ can be calculated as:

$$\begin{pmatrix} h_{x1} \\ h_{y1} \\ h_{x2} \\ h_{y2} \end{pmatrix} = \begin{pmatrix} m_{0,x1} \\ m_{0,y1} \\ m_{0,x2} \\ m_{0,y2} \end{pmatrix} + \begin{pmatrix} s_1 & 0 \\ 0 & s_1 \\ s_2 & 0 \\ 0 & s_2 \end{pmatrix} \begin{pmatrix} x \\ y \end{pmatrix} \quad (2)$$

It is straightforward to extend this model for an arbitrary number of spots 180.

For general wave signals, a similar linear model can be chosen. In general, the following model in Equation (3) applies, where h is the vector of estimated signal values for position $(x\ y)^T$, $h_0$ is the absolute offset in the sensor space, and $A_0$ is a general scale matrix.

$$h = h_0 + A_0 \begin{pmatrix} x \\ y \end{pmatrix} \quad (3)$$

Figure 5:
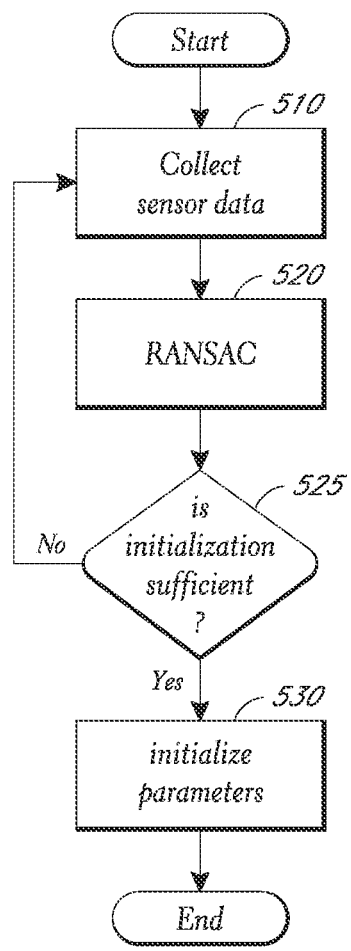
FIG. 5 illustrates a non-linear relationship between the actual ("truth") ground position of a mobile device and the output of a sensor detecting signals at that ground position.

A flow chart for computing the parameters of this linear model (either Equation 2 or Equation 3) is shown in FIG. 5. At state 510, sensor measurements are obtained from the signal sensor 170. When a sensor measurement is obtained, data about the concurrent pose of the device 100 is also obtained (e.g., at the same or substantially the same time), such as from one or more on-board dead-reckoning sensors 190 or from separate monitoring systems. State 510 continues while the device 100 travels a short distance. At state 520, a RANSAC method (or, more generally, any algorithm for fitting data into a linear model) is run. At state 525 the status of the process is evaluated. Based on, for example, the number of data points evaluates (which may be set to 2, 5, 10, or more), the amount of time elapsed (which may be set to 1 second, 5 seconds, 10 seconds, 30 seconds, or more), or the quality of the data fitting algorithm (which may be set to be about or above a particular threshold), an embodiment may determine the initialization is sufficient. If so, then at state 530, the output of RANSAC is used to initialize the parameters for the relevant equation. If not, the initialization process continues.

RANSAC (Random Sample Consensus) is an iterative method to estimate the parameters of a mathematical function from sensor data that include outliers (see, e.g., A. Fischler, R. C. Bolles. Random Sample Consensus: A Paradigm for Model Fitting with Applications to Image Analysis and Automated Cartography. Comm. of the ACM, Vol 24, pp 381-395, 1981). The RANSAC algorithm runs several iterations. In a given iteration a number of measurements are chosen at random (the term "random" as used herein, encompasses pseudo random). In an embodiment using two spots 180, two signal sensor 170 readings each containing measurements to both spots 180 are sufficient. In an example implementation, it was determined that additional sample readings per iteration did not produce a significant improvement on the results and increased the resources consumed by the RANSAC process. From the chosen measurements the parameter values are determined by solving the set of equations arising from placing the chosen measurements into the mathematical model, Equation (2). More generally, Equation (3) may be used. The computed parameters are then evaluated using some or all available sensor data, optionally including dead reckoning data. This usually computes a score such as the number of inliers or the overall residual error. After completing the desired number of iterations, the parameter values with a score meeting certain criteria (e.g., the best score) are chosen as the final parameters.

Embodiments may use variations of RANSAC or alternatives to it.

Illustrative examples of the parameters used during initialization are presented below, in the discussion of GraphSLAM.

Once the initialization process is complete or the parameters for the relevant equation are otherwise determined, one or more algorithms for accounting for noisy sensors and dead-reckoning drift can be used to implement a system to effectively track the pose of the mobile device 100 with more accuracy, in less time, and/or with lower computational resource requirements than many conventional methods. Examples of such algorithms include the Kalman Filter, the Extended Kalman Filter (EKF), the Invariant Extended Kalman Filter (IEKF), and the Unscented Kalman Filter (UKF). However, the ability of these filters to effectively track pose after the initialization process of FIG. 500 tends to degrade in environments where the distribution of the wave signal is non-linear. But even in environments, such as room 110, where the wave signal is distorted (e.g., by multi-path), the linear model described here is still useful for the initialization of non-linear systems according to what is disclosed herein.

As discussed above, multi-path occurs when the wave signal not only reaches the signal sensor 170 directly but also in other ways, such as by reflecting from nearby objects or walls (e.g. the right wall 130 in FIG. 1). As the sensor 170 moves closer to wall 130, due to occlusion and limited field of view, the sensor 170 receives more signal contributions from wall reflections. The result is a shift in the signal back to a position that appears to be further away from the wall 130.

Figure 6:
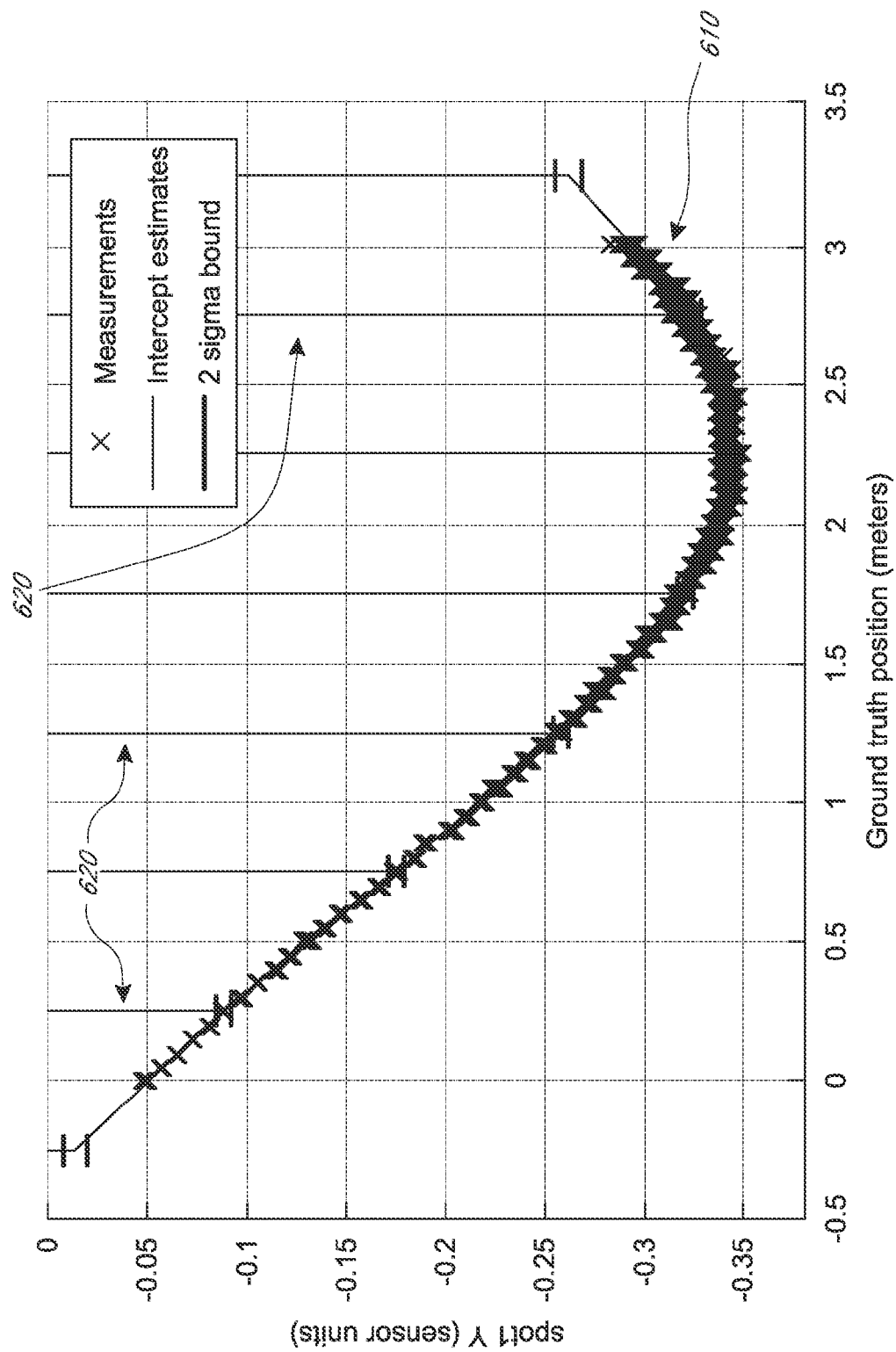
FIG. 6 is a flow chart of an example localization filter initialization process.

FIG. 6 illustrates this scenario where right wall 130 reflects the signal from the spots 180. Note how the curve 610 bends over and switches to the opposite direction: when the mobile device 100 is 3 meters from its starting point the sensor 170 is reporting a detected value of approximately −0.3, the same value it reported at approximately 1.5 meters, instead of the expected value of approximately −0.55 predicted by a linear model. This compression of the sensor signal appears with any wave signal that shows reflections from walls or other objects. It makes position estimation particularly difficult because a range of signal sensor readings do not match to exactly one ground position but instead have a least two ground position candidates. Even more candidates are possible when taking measurements in 2D or higher dimensions, or when the multipath pattern involves multiple objects, for example.

However, if the expected signal strength as a particular location is known, then signal strength measurements can still be used for localization in a multi-path environment via, for example, a Bayesian localization framework such as an EKF. In an example embodiment, by way of illustration, a piece-wise linear approximation (pieces are illustrated in FIG. 6 by the solid vertical lines 620) is used to substantially simultaneously learn the signal shape or "map" (the strength of the signal throughout the environment) and estimate the pose of the mobile device 100. This is done using a simultaneous localization and mapping (SLAM) approach.

The second challenge mentioned was rotational variability. When turning a sensor 170 in place, the measurements of the observed vector signal can change. This is the rotational variability of the sensor 170. For example, a sensor 170 in an embodiment using spots 180 outputs (x y) coordinates of the center of a spot 180 on the sensor plane. The (x y) coordinates essentially are a vector representing bearing and elevation to the spot 180. Ideally, as the sensor 170 rotates in place, only the bearing should change—the elevation should stay constant. In practice, however, elevation changes (usually, but not always, by a relatively small amount) due to variations in manufacturing, calibration errors, or misalignments in mounting the sensor 170 on the mobile device 100.

Figure 7:
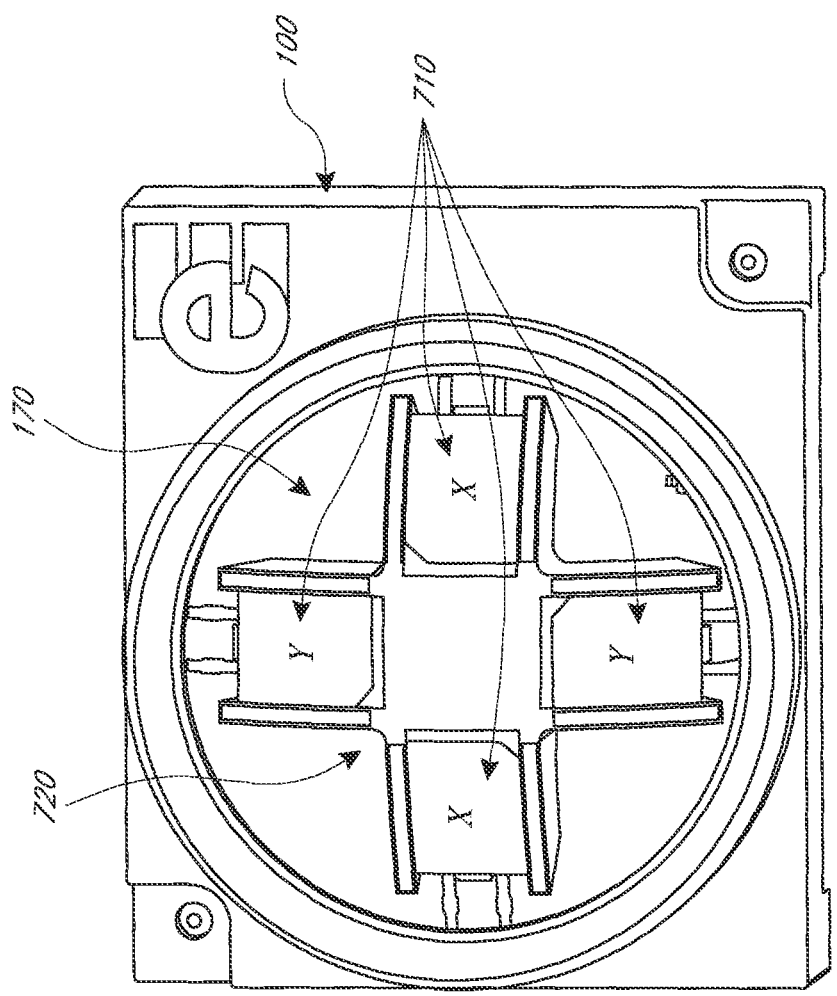
FIG. 7 illustrates an example embodiment of a signal sensor for localization.
Figure 7:
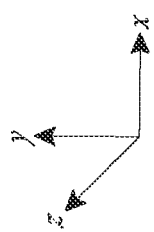

For example, FIG. 7 shows a top-down perspective of an example of one embodiment of a signal sensor 170 mounted on a mobile device 100. Although FIG. 1 represents the sensor 170 as protruding from the mobile device 100, FIG. 7 depicts an embodiment in which the sensor 170 is recessed in a cavity or depression with a substantially circular perimeter (although other perimeters could also be used). The sensor 170 comprises four infrared photodiodes 710 mounted on a pyramidal structure 720. The top of the pyramid 720 does not contain a photodiode 710 and is substantially coplanar with the top surface of the mobile device 100. In other embodiments, the sensor 170 may have a different structure including, for example, more or fewer photodiodes 710 arranged in a similar or different configuration. The approach described herein can be adapted to account for the geometric properties of the sensor 170 used. In the arrangement shown in FIG. 7, each of the photodiodes 710 measures incoming light by producing an electric current substantially proportional to the received light. Each of the two opposing photodiode pairs is then used for measuring the direction of light on the corresponding axis. Below, the computation of the light direction and the effects of rotational variability for the x axis of the sensor are discussed. The computations for the y axis are analogous. Thus, what follows describes a mathematical system that models rotational variability for the signal sensor 170 of FIG. 7 and can be readily adapted to a wide range of signal sensors.

Figure 8:
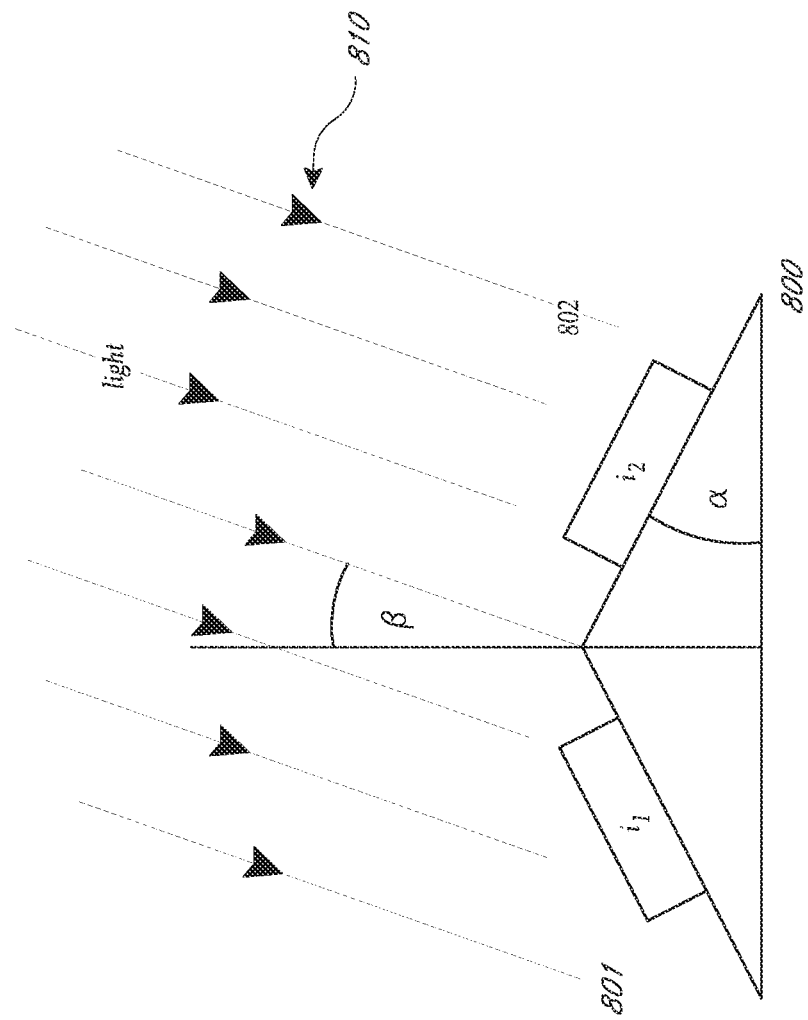
FIG. 8 is a cross-section of the sensor of FIG. 7.

FIG. 8 illustrates a representation 800 of the sensor 170 of FIG. 7, simplified for the purposes of clarity. Only the pair of photodiodes 710 measuring along the x axis is shown. Light from one of the spots 180 (it can be assumed to be spot 181 without any loss of generality) is directed at the sensor 170 as illustrated by light vectors 810. The x coordinate reported by the sensor 170 is proportional to the tangent of the elevation angle ($\beta$) to spot 181. This tangent of $\beta$ is measured through the two currents i1 and i2 of the opposing photodiodes 801 and 802, respectively. The angle $\alpha$ of the pyramid is a parameter that may vary among embodiments. Some embodiments may have an adjustable angle $\alpha$. The below assumes that $\alpha$ is greater than zero or that such an effect is simulated (e.g., through the use of apertures above the photodiodes which cast shadows and limit the exposure of the photodiodes to light from the spots.). Generally, the larger the angle $\alpha$ is, the larger the sensitivity of the sensor 170 to changes in location, but the smaller the field of view (e.g., the closer the sensor 170 must remain to the spots). While any effective angle $\alpha$ between 0 and 90 degrees may be used, it is preferably within the range of 15 to 75 degrees. Some embodiments may use, for example, 30, 45, or 60 degrees.

The coordinate $h_{x1}$ of spot 181 is equal to the tangent of $\beta$ and is measured by:

$$h_{x1} = \frac{i_1 - i_2}{i_1 + i_2} = \tan\beta \tan\alpha. \tag{4}$$

The rotational variability is modeled by an offset in $\beta$ that changes with the orientation of the sensor 170 such that Equation (5) holds, where $\beta'$ is the angle to the ideal axis of rotation perpendicular to the ground plane and $\beta_\epsilon$ is the angular error that changes with rotation.

$$\beta = \beta' + \beta_\epsilon \tag{5}$$

Inserting (5) in (4) and applying the rule of the tangent of the sum of angles yields:

$$\frac{i_1 - i_2}{i_1 + i_2} = \tan(\beta' + \beta_\varepsilon)\tan\alpha \tag{6}$$

$$= \frac{\tan\beta' + \tan\beta_\varepsilon}{1 - \tan\beta'\tan\beta_\varepsilon}\tan\alpha$$

Since $\beta_\epsilon$ is small, $\tan \beta_\epsilon$ is approximated by:

$$\tan\beta_\varepsilon = \frac{\sin\beta_\varepsilon}{\cos\beta_\varepsilon} \approx \frac{\beta_\varepsilon}{1} = \beta_\varepsilon \tag{7}$$

Substituting (7) into (6) yields:

$$\frac{i_1 - i_2}{i_1 + i_2} \approx \frac{\tan\beta' + \beta_\varepsilon}{1 - \beta_\varepsilon \tan\beta'} \tan\alpha \qquad (8)$$

For elevation angles $\beta'$ that are much less then 90°, $1-\beta_\varepsilon \tan\beta'$ is approximated as 1, yielding Equation (9), where $c_x$ is the rotational variance on the x axis depending on the orientation of the signal sensor 170.

$$\frac{i_1 - i_2}{i_1 + i_2} \approx \tan\beta' \tan\alpha + \beta_\varepsilon \tan\alpha \qquad (9)$$
$$= \tan\beta' \tan\alpha + c_x$$

For the y axis of the sensor 170 another bias term $c_y$ is derived in an analogous way. Together both parameters form the vector c of rotational variability.

$$c = \begin{pmatrix} c_x \\ c_y \end{pmatrix}. \qquad (10)$$

Since the direction $\beta$ to the spots 180 can be arbitrary, the parameters for rotational variability are substantially independent of where the spots 180 are located. All spots 180 may therefore share substantially the same parameters.

Similar and analogous results can be obtained for other signal sources and sensor types. Rotational variability is not limited to the illustrated embodiment. Other sensor(s) 170 that measures bearing-to-signal sources 180 can show similar effects when the vertical axis of the sensor 170 is slightly misaligned or the sensor 170 otherwise rotates around an axis different from the ideal one. For example, antennas for radio or other wireless communication can show slight changes in the received signal when they rotate. Thus, an optional useful model of the way the vector of signal values changes on rotation of the sensor 170 is a function that only depends on the orientation of signal sensor 170 and parameters describing the rotational variability of the signal sensor 170.

Figure 9:
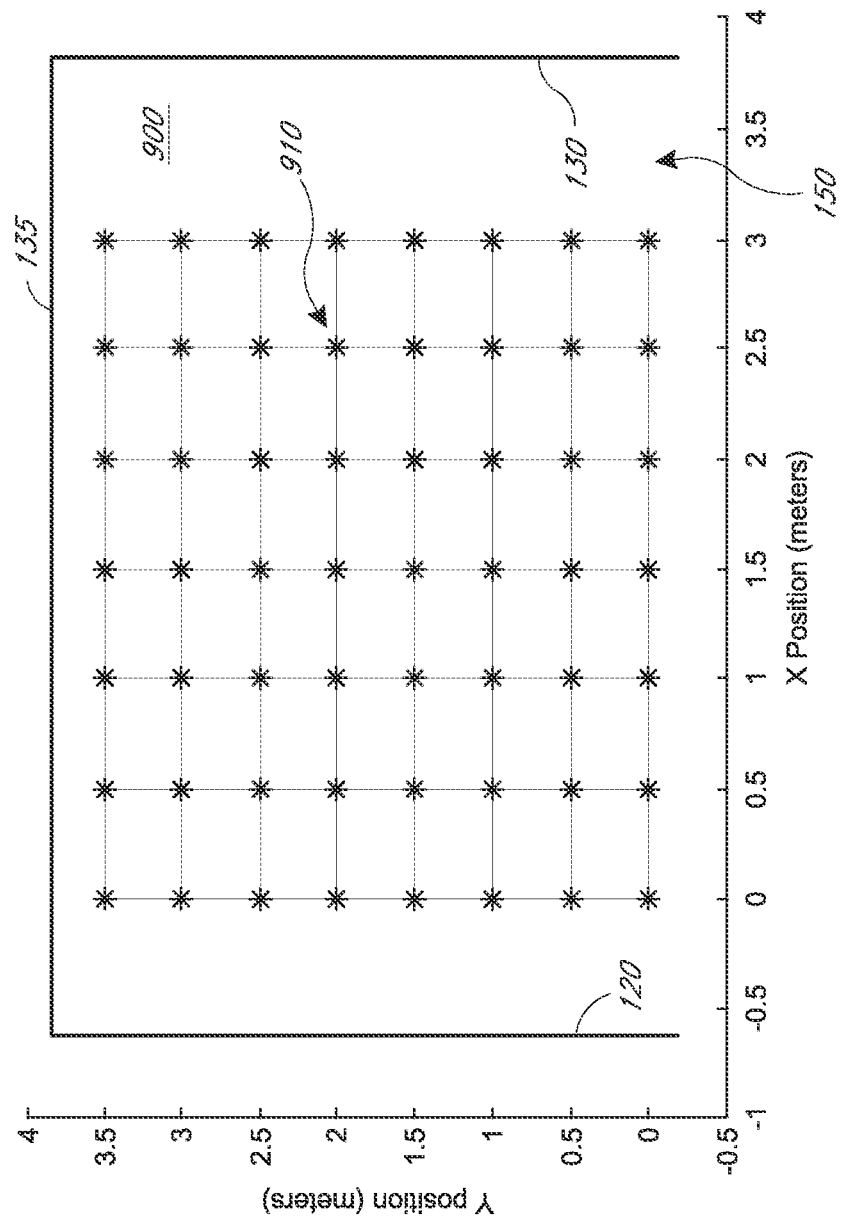
FIG. 9 illustrates a top-down perspective of an illustrative example operating environment with a grid of sensor measurement points.
Figure 10:
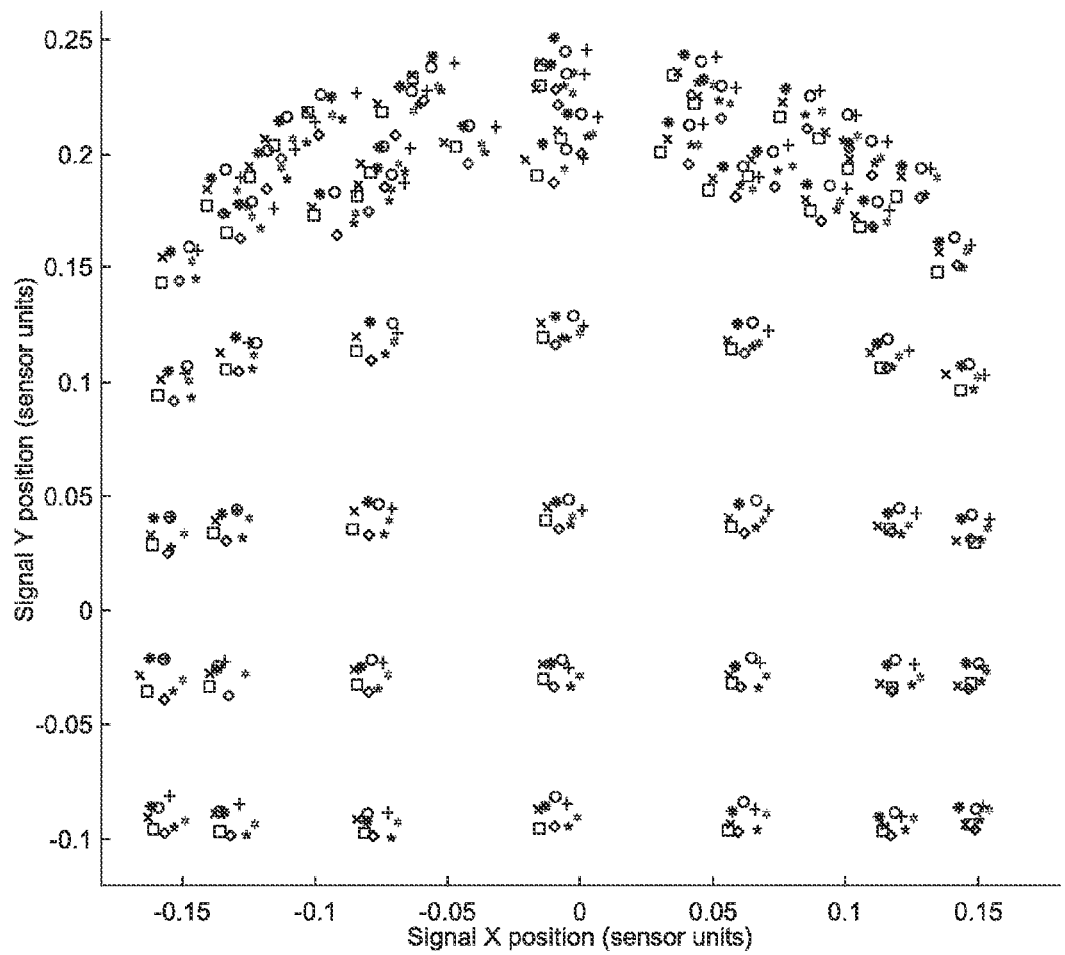
FIG. 10 illustrates an example of rotational variance of signal measurement as well as detected variation in the signal throughout the environment of FIG. 9.

FIGS. 9 and 10 illustrate rotational variability and non-linearity arising from multi-path signals. The two figures depict the environment of room 110 from a top down perspective. FIG. 9 shows a regular grid 900 consisting of 8×7 positions (every 50 cm in this example) on the floor 150. A system using spots 180 was deployed with an appropriately configured signal sensor 170. At a given location 910, sensor measurements were taken with eight different sensor orientations (every 45°).

The measurements were then rotated back and drawn in a common reference frame. FIG. 10 shows the resulting signal measurements using different symbols for the eight orientations. At a given location 910, the measurements form a ring which shows the rotational variability at this location. In this experiment the radius is almost constant over the entire room 110. The mean of rotational variability is about 0.0072 sensor units, which corresponds to an angular error of about $\beta_\varepsilon = 0.72°$. The error caused by rotational variability can be constant (as in this example) but might also change over time or location, e.g., if the angular error $\beta_\varepsilon$ is more significant or if there are other similarly variable sources of error, such as uneven floors or motion dependent device vibration, not modeled in Equations (4)-(9).

Changes in the pitch or angle of the mobile device relative to the surface it is traversing can also cause or contribute to rotational variability. For example, uneven floors or ground such as might result from rolling terrain, general bumpiness, twigs or branches, brickwork, and the like can cause the pitch of the mobile device to change. In some embodiments, rotational variability due to change in pitch is monotonic, although it complements rotational variability due to manufacturing and other sources At least some rotational variability due to changes in pitch may be accounted for using the methods described herein. For example, changes in pitch of less than 3, 5, or 7 degrees (or other pitches) may be accommodated by some embodiments without modification to what is disclosed herein.

FIG. 9 also shows the effect of multi-path signals. In the illustrated scenario, the walls on the left 120, right 130, and front 135 cause signal reflections. While the left wall 120 and right wall 130 create some level of signal compression, the front wall 135 causes severe reflections that make the signal bend over. Even worse, in the corners of the room, the signal is reflected from two walls and therefore the resulting measurement is even more distorted.

Although there is significant signal distortion, it has been determined that the error is systematic and continuous. This allows modeling the nature of the signal using non-linear systems. An example embodiment approximates the non-linearity caused by multi-path through the use of piece-wise linear functions. This example technique is described below in greater detail. Other approximations, e.g., using Splines (piecewise polynomial (parametric) curves which may be used to approximate complex shapes using curve fitting) or Nurbs (non-uniform rational basis splines, which are mathematical models which may be used to generate and represent surfaces and curves) may also be used and may provide more accurate representations of the non-linear signal distortion. However, experimentation with certain embodiments has indicated that the use of bi-linear interpolation results in faster processes and produces sufficiently good results in embodiments that have limited computational resources. Embodiments with more computational resources or those with relaxed time constraints may beneficially use other representations, including Splines or Nurbs.

In some embodiments, localization of a mobile device 100 equipped with a signal sensor 170 is performed by learning the signal distribution in the environment 110 while at the same time (or at substantially the same time) localizing the mobile device 100. This is known as simultaneous localization and mapping (SLAM). As discussed above, in the following it is assumed that the pose of the mobile device 100 and the signal sensor 170 are substantially identical. In some embodiments they are not, and it is straightforward to add, for example, a fixed coordinate transformation between the two poses. However, assuming pose identity facilitates understanding of the various disclosed aspects.

In SLAM, a device moves through a time series of poses $x_0 \ldots x_T$, $x_t = (x, y, \theta) \in SE(2)$, in an environment (e.g. room 110) containing N map features $m_1 \ldots m_N$, $m_i \in \Re^M$. Here SE(2) is the space of poses in the 2 dimensional plane and $\Re^M$ the space of the map features. Without loss of generality, $x_0 = (0, 0, 0)^T$. At each time step $t=1 \ldots T$ the system receives a motion input $u_t$ (e.g., odometry from dead reckoning sensors 190) with covariance $R_t$ and a measurement $z_t$ (e.g., of signal strength from signal sensors 170) with covariance $Q_t$.

The motion input $u_t$ is measured, for example, by motion sensors 190 on the mobile device 100 and describes the change in pose of the sensor 170 from time step t−1 to t. As mentioned above, in certain embodiments the motion input may be provided by external sensors or a combination of internal and external sensors. The input vector $u_t$ is associated with a covariance $R_t$ that models the accuracy of the pose change. Typical motion sensors 190 include wheel encoders, gyroscopes, accelerometers, IMUs and other dead-reckoning systems. A motion model defined by a function g describes the motion of the device 100 since the previous time step where $e_u$ is a zero mean error with covariance $R_t$:

$$x_t = g(x_{t-1}, u_t) + e_u \qquad (11)$$

An example of input $u_t$ is a forward translation d followed by a rotation α: $u_t = (d\alpha)^T$. Equation (11) then resolves into the following form:

$$x_t = \begin{pmatrix} x \\ y \\ \theta \end{pmatrix} + \begin{pmatrix} d\cos\theta \\ d\sin\theta \\ \alpha \end{pmatrix} + e_u \qquad (12)$$

For those skilled in the art it is straightforward to substitute different motion models g and input vectors $u_t$ depending on the geometry of the mobile device 100 and available motion sensors 190. The systems and methods disclosed herein apply regardless of the motion model.

When the signal sensor 170 on the mobile device 100 obtains a new reading $z_t$ of the wave signals, the SLAM system uses a sensor model to predict the observation. As in the case of motion, the sensor reading $z_t$ is associated with a covariance $Q_t$ modeling the accuracy of the measurement. The sensor model is defined by a function h that predicts an observation given the sensor 170 pose at time step t and map features as in Equation (13), where $e_z$ is a zero mean error with covariance $Q_t$. The sensor model h depends on the map features and the available signal sensor 170 in the mobile device 100. In early SLAM applications such as those described in Thrun et al. [2005, Chapter 10], map features are landmarks and the sensor model h computes bearing and distance to them. The systems and methods disclosed herein optionally use a very different approach: some or all of the features are signal values at predetermined or fixed locations and, few or none of the features are landmarks in the environment. The expected values of wave signals at a given device 100 pose are computed by h as follows.

$$z_t = h(x_t, m_1 \ldots m_N) + e_z \qquad (13)$$

In SLAM it is possible to include in the sensor model calibration parameters like those describing rotational variability of the sensor 170. The SLAM algorithm then not only estimates device pose and map features, but also estimates the calibration parameters. All calibration parameters are summarized in a vector c. The size of this vector depends on the sensor 170. For example, in an embodiment using the reflection from spots of modulated light created by a project 160 as the signal sources 180, the calibration parameters include the two bias constants $(c_x, c_y)$ in Equation (10). The observation model in Equation (13) then includes this parameter:

$$z_t = h(x_t, c, m_1 \ldots m_N) + e_z \qquad (14)$$

Embodiments also learn the vector field generated by M signals over the environment. This vector field can mathematically be described as a function that maps a ground pose to a vector of M signal values.

$$VF: SE(2) \to \mathfrak{R}^M \qquad (15)$$

Since signals are independent of sensor 170 orientation (per the preferences set forth above), the space of poses SE(2) can be decomposed into position and orientation. The vector field over position is then modeled as a piece-wise linear function by laying a regular grid of node positions $b_i = (b_{i,x}; b_{i,y})^T$, $i=1 \ldots N$ onto the ground 150 (or onto whatever surface the mobile device 100 is traversing). This creates rectangular cells with one node at each of the cell's four corners. Each node i holds a vector $m_i \in \mathfrak{R}^M$ describing the expected signal values when placing the sensor at $b_i$ and pointing at a pre-defined direction $\theta_0$. Returning to the running example of signal sources 180 being spots of modulated light, the vector $m_i$ holds four values—the coordinates of both spots 180: $m_i = (m_{i,x1}, m_{i,y1}, M_{i,x2}, M_{i,y2})^T$.

The spacing of cells in the regular grid defines the granularity and precision with which the wave-signal distribution in the environment 110 is modeled. A finer spacing leads to more cells, yielding better precision but requiring more memory. A coarser spacing results in fewer cells, requiring less memory but at the possible cost of precision. The exact parameter for the cell size depends on the environment, mobile device, and the application. For the purpose of covering an environment 110 with reasonable precision (e.g., for systematic floor cleaning), the cell size could be 0.5 m to 2 meters for a system using spots of frequency modulated light as signal sources 180 in an environment with a ceiling height of 2.5 to 5 meters.

Figure 11:
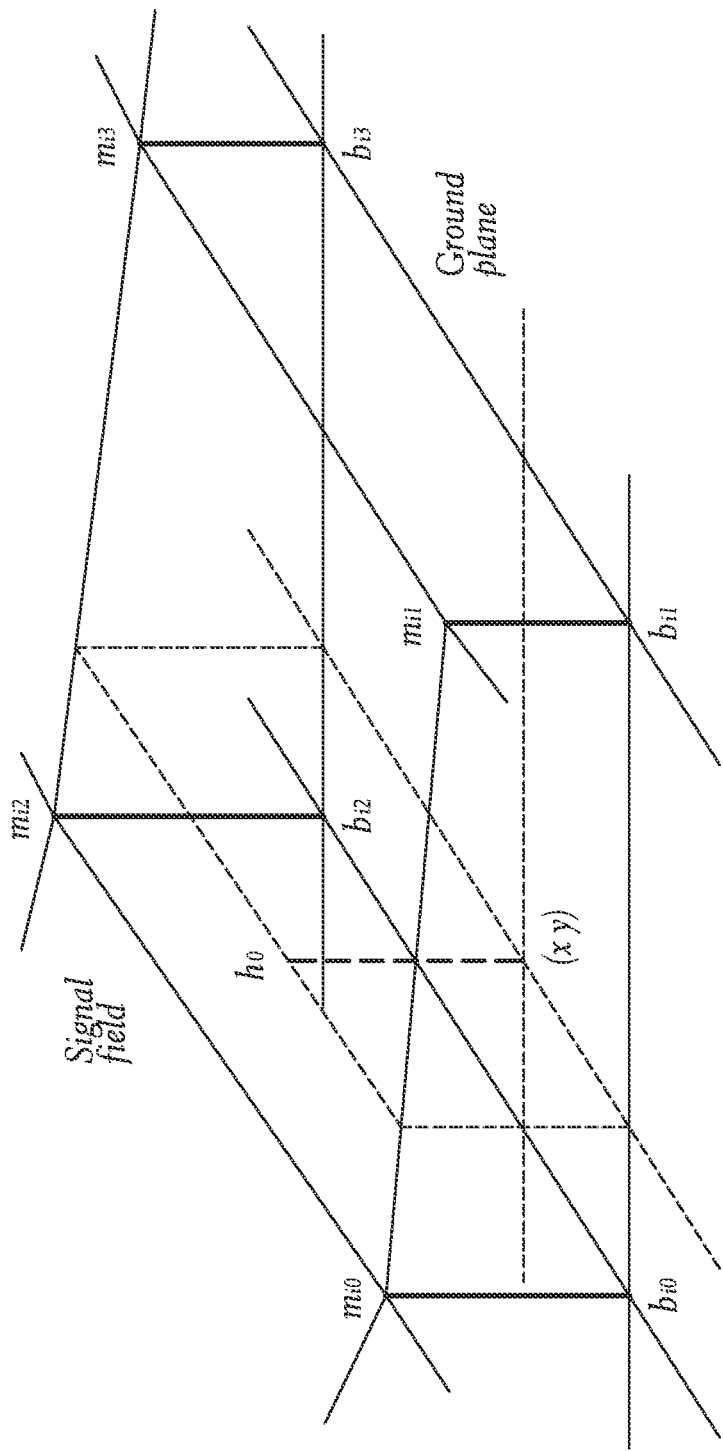
FIG. 11 illustrates bilinear interpolation used by some embodiments.

For an arbitrary sensor position with orientation $\theta_0$, the expected signal values are computed by bilinear interpolation from the nodes of a cell (e.g., the four nodes) containing the sensor position. Such a cell is illustrated in FIG. 11. The four nodes may be determined from the sensor position at time t and node positions $b_i$. "Current cell" refers to the cell in which the sensor is positioned at the current time step t. Let $x_t = (x, y, \theta)$ be the sensor pose and $b_{i0} \ldots b_{i3}$ the cell nodes enclosing the sensor 170 as shown in FIG. 11.

The expected signal values at (x, y) with orientation $\theta_0$ are then computed as Equation (16), where moo, $m_{i0}$, $m_{i1}$, $m_{i2}$ and $m_{i3}$ are the signal values at the four cell nodes and $w_0$, $w_1$, $w_2$ and $w_3$ are the weights of the bilinear interpolation computed as Equation (17).

$$h_0(x, y, m_1 \ldots m_N) = w_0 m_{i0} + w_1 m_{i1} + w_2 m_{i2} + w_3 m_{i3} \qquad (16)$$

$$w_0 = \frac{(b_{i1,x} - x)(b_{i2,y} - y)}{(b_{i1,x} - b_{i0,x})(b_{i2,y} - b_{i0,y})} \qquad (17)$$

$$w_1 = \frac{(x - b_{i0,x})(b_{i2,y} - y)}{(b_{i1,x} - b_{i0,x})(b_{i2,y} - b_{i0,y})}$$

$$w_2 = \frac{(b_{i1,x} - x)(y - b_{i0,y})}{(b_{i1,x} - b_{i0,x})(b_{i2,y} - b_{i0,y})}$$

$$w_3 = \frac{(x - b_{i0,x})(y - b_{i0,y})}{(b_{i1,x} - b_{i0,x})(b_{i2,y} - b_{i0,y})}.$$

The final expected signal values are computed by taking into account sensor orientation θ and the parameters c describing the rotational variability of the sensor 170:

$$h(x_t, c, m_1 \ldots m_N) = h_R(h_0(x, y, m_1 \ldots m_N), \theta, c). \qquad (18)$$

Here $h_R$ is a continuous function that transforms the interpolated signal values obtained through Eq. (16) by the sensor orientation and rotational variability. This is usually a rotation by orientation θ followed by a correction with the rotational variability c. In the running example, turning the sensor 170 in place causes the spot 181 coordinates to change according to the rotation angle θ but in the opposite direction. The rotational component $h_R$ therefore becomes Equation (19), where $(h_{x1}, h_{y1}, h_{x2}, h_{y2})$ is the output vector of Equation (16). It is also possible to formulate the equations for a variable number of spots 180 since the components in Equations (16)-(19) are not correlated between spots 180. Similar equations can be readily obtained for other signal sources.

$$h_R(h_{x1}, h_{y1}, h_{x2}, h_{y2}, \theta, c_x, c_y) = \begin{pmatrix} \cos\theta & \sin\theta & 0 & 0 \\ -\sin\theta & \cos\theta & 0 & 0 \\ 0 & 0 & \cos\theta & \sin\theta \\ 0 & 0 & -\sin\theta & \cos\theta \end{pmatrix} \begin{pmatrix} h_{x1} \\ h_{y1} \\ h_{x2} \\ h_{y2} \end{pmatrix} + \begin{pmatrix} c_x \\ c_y \\ c_x \\ c_y \end{pmatrix} \quad (19)$$

It is possible to apply more complex schemes for predicting the sensor signal that use more than only the four nodes of the current cell. A cell with fewer nodes could also be used. In another embodiment, the function in Equation (16) is evaluated for the current and several neighboring cells and then a weighted mean of them is computed as the final result. The weights are taken as the mass of probability of the current position estimate that falls into each cell. The weight of a given cell is a function of the probability that the sensor or mobile device is within this cell. This probability can be derived from the current mobile device pose and associated uncertainty as it is computed by the localization filter.

The above understandings and equations enable the application of a SLAM algorithm for estimating device path, rotational variability, and/or the signal values at the node positions. Optionally, full SLAM and/or on-line SLAM may be used.

In full SLAM, the complete trajectory of the device 100, rotational variability of the sensor 170, and/or some or all map features are computed. For example, the state that is estimated is:

$$Y = \begin{pmatrix} x_1 \\ \vdots \\ x_T \\ c \\ m_1 \\ \vdots \\ m_N \end{pmatrix} \quad (20)$$

One algorithm that computes an estimate of Y is GraphSLAM, which is used in some embodiments and is described in more detail below.

In contrast, on-line SLAM estimates the current pose and some or all map features at each time step t=1 . . . T. The state estimated at each time step t is:

$$y_t = \begin{pmatrix} x_t \\ c \\ m_1 \\ \vdots \\ m_N \end{pmatrix} \quad (21)$$

There are several algorithms that estimate $y_t$ over time. Examples using EKF-SLAM, EIF-SLAM and ESEIF-SLAM are described below. Embodiments may use any of the described full SLAM or on-line SLAM algorithms, as well as other algorithms. Some embodiments can be configured to use a particular SLAM algorithm depending on, for example, a user's preference, the computational resources available, and other operational constraints.

GraphSLAM is a non-linear optimization method for estimating the state vector in Equation 20 by finding the values in Y that best explain the sensor and motion data from sensors 170 and 190. GraphSLAM estimates Y as the solution to a non-linear least squares problem in finding the minimum of the following objective function where the quantities are defined as described before:

$$J = \sum_{t=1}^{T} (x_t - g(x_{t-1}, u_t))^T R_t^{-1} (x_t - g(x_{t-1}, u_t)) + \quad (22)$$

$$\sum_{t=1}^{T} (z_t - h(y_t))^T Q_t^{-1} (z_t - h(y_t))$$

Figure 12:
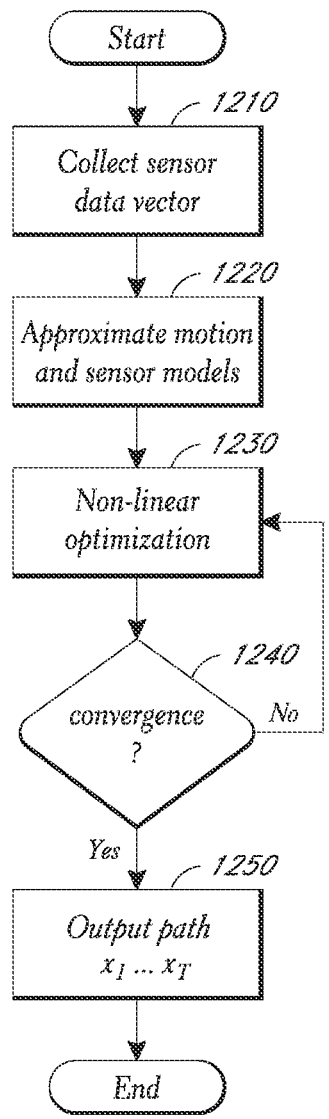
FIG. 12 is a flow chart illustrating an example use of GraphSLAM for localization.

An example implementation of GraphSLAM is illustrated in FIG. 12. One general approach is to first provide an initial estimate of the state vector Y at state 1210. This may be based on, for example, data from the dead reckoning sensors 190 or data from the signal sensors 170. Then the embodiment approximates motion model g(·) and sensor model h(·) by linear models using Taylor expansion at the current estimate of the state vector at state 1220. This results in a quadratic function of Equation (22). The linear equation system that reduces or minimizes the quadratic function obtained in state 1220 is solved or optimized at state 1230. This provides an improved estimate of Y. The second and third states are repeated until the solution converges to a desired degree at state 1240. If sufficient convergence is not obtained, then optimization state 1230 is repeated. If it is obtained, then at state 1250 a path is output.

The linear equation system may optionally be solved during optimization state 1230 using Conjugate Gradient, since the system is usually sparse and positive definite.

For providing an initial estimate of the state vector in state 1210, the following method can be used. First, the initial device poses $x_1 \ldots x_T$ are computed from $x_0=(0, 0, 0)^T$ by iteratively applying the motion model in (11) for each t=1 . . . T. Second, the initial rotational variability is c=ĉ where ĉ is a rough guess about the values of rotational variability that depend on the sensor 170. In the running example, some embodiments use $ĉ=(0, 0)^T$ because the rotational variability is usually small. The initial node values $m_i$ are computed from Equations (1) and (2). For example, the parameters in Equation (1) are computed by applying RANSAC over a short initial sequence, as discussed above. The node values $m_i$ are then obtained from the node position $b_i$ through Equation (2).

The short initial sequence typically contains a minimum or relatively low number of sensor samples (e.g., 2 to 50) while the mobile device 100 moves a certain distance. This distance is usually proportional to the chosen cell size such that enough samples are available that cover a reasonable fraction of the cell. For example, for a cell size of 1 meter, the distance threshold may be selected within the range of 0.5 m to 1 meter. More generally, some embodiments may be configured to travel a distance of ⅓ to ⅔ of the cell size.

This distance may also depend on the size of the mobile device 100: typically, larger mobile devices should travel further during the initialization phase. Optionally, a given sample is spaced a minimum distance from an adjacent sample. This distance may be determined based on a dynamically configured initialization travel distance and sample count, for example. It may also be fixed a priori so that samples are taken after every half second of travel or after every 10 centimeters of travel, for example, although other time periods and distances may be used.

GraphSLAM may be implemented as a batch method since the motion and sensor data needs to be available when computing the non-linear optimization. Furthermore, the amount of computation is significant. These constraints may make it difficult to use GraphSLAM in certain embedded systems with limited computational resources, such as if the mobile device 100 is a conventional vacuum cleaner or other consumer product. GraphSLAM is nevertheless useful as a baseline algorithm for computing the best possible result given the sensor data and a chosen model. For example, it can be used during the development of products or selectively run when computational resources are available to check the performance of other methods. Further, there are certain embodiments of product mobile devices where there are sufficient computational and memory resources to utilize GraphSLAM.

One such method for state estimation used by some embodiments is an Extended Kalman Filter (EKF). The EKF is a non-linear variant of the Kalman Filter (KF). EKF-SLAM is an on-line SLAM method. The state vector contains the current pose of the device 100 but not older or future poses (or estimates thereof). Furthermore, the size of the state grows as the mobile device 100 moves in the environment 110. Initially the state contains only device pose, rotational variability and the node estimates of the 4 nodes of the initial cell.

$$y_0 = \begin{pmatrix} x_0 \\ c \\ m_1 \\ m_2 \\ m_3 \\ m_4 \end{pmatrix} \quad (23)$$

As the mobile device 100 moves around and visits further cells, the system grows by augmenting the state vector with further nodes. After t time steps and visiting cells with a total of n nodes the state becomes:

$$y_t = \begin{pmatrix} x_t \\ c \\ m_1 \\ \vdots \\ m_n \end{pmatrix} \quad (24)$$

The EKF computes an estimate of this state by maintaining mean and covariance modeling a Gaussian distribution over the state.

$$y \sim N(\mu, \Sigma) \quad (25)$$

The initial mean is set to equation (26), where $\hat{c}$ is a rough guess/estimate of the rotational variability of the sensor 170 and $\hat{m}_1 \ldots \hat{m}_4$ are initial values of the four nodes obtained from sensor data of a short initial sequence as described before using Equations (1) and (2). Again, in a sample embodiment using spots 180, the initial rotational variability can be set to $\hat{c}=(0, 0)^T$.

$$\mu_0 = \begin{pmatrix} x_0 \\ \hat{c} \\ \hat{m}_1 \\ \hat{m}_2 \\ \hat{m}_3 \\ \hat{m}_4 \end{pmatrix} \quad (26)$$

The initial covariance is a diagonal matrix where the vehicle uncertainty is set to 0 and the uncertainties of rotational variability and the four initial nodes are infinite. For implementation on a computer, $\infty$ can be replaced by a large number.

$$\sum_0 = \begin{pmatrix} 0 & \ldots & \ldots & \ldots & \ldots & \ldots & 0 \\ \vdots & 0 & \ldots & \ldots & \ldots & \ldots & 0 \\ \vdots & \vdots & 0 & \ldots & \ldots & \ldots & 0 \\ \vdots & \vdots & \vdots & \infty & 0 & \ldots & 0 \\ \vdots & \vdots & \vdots & 0 & \ddots & \ddots & \vdots \\ \vdots & \vdots & \vdots & \vdots & \ddots & \ddots & 0 \\ 0 & 0 & 0 & 0 & \ldots & 0 & \infty \end{pmatrix} \quad (27)$$

On object motion $u_t$ with covariance $R_t$, EKF-SLAM updates the state as Equations (28) and (29), where f extends the motion model g over all state variables and $F_y$ is its Jacobian with respect to state per Equations (30)-(31).

$$\bar{\mu}_t = f(\mu_{t-1}, u_t) \quad (28)$$

$$\sum_t = F_y \sum_{t=1} F_y^T + R_t \quad (29)$$

$$f(y_{t-1}, u_t) = \begin{pmatrix} g(x_{t-1}, u_t) \\ c \\ m_1 \\ \vdots \\ m_N \end{pmatrix} \quad (30)$$

$$F_y = \frac{\partial f}{\partial y}(\mu_{t-1}, u_t) \quad (31)$$

When a new sensor observation $z_t$ with covariance $Q_t$ is taken, the system determines the current cell, i.e. the cell in which the mean estimate of current device pose $\hat{x}_t$ falls, and then updates the mean and covariance of the state.

In general the current cell at time t can be:
1. A cell where all four nodes are already part of the state vector.
2. A cell where at least one node but not all four nodes are part of the state vector.
3. A cell where none of the four nodes are in the state vector.

In the first case no changes are required to the state vector and the system can continue updating mean and covariance as described further below.

In the second and third cases, nodes not yet present in the state vector need to be added by augmenting the state with the new nodes. In general, adding a node to the state vector containing n nodes is achieved by Equations (32) and (33), where $\hat{m}_{n+1}$ and $M_{n+1}$ are the mean and covariance of the new node. This mean and covariance can be computed from nodes already contained in the state vector by linear extrapolation per Equations (34) and (35), where $A_i$, i=1 . . . n are matrices weighting the contribution of each node in the extrapolation, M is the covariance over all nodes, and S is additional noise for inflating the new covariance to allow the new node to vary for accommodating the non-linear structure of the wave signal. In some embodiments and in certain scenarios, the vector field changes slowly over space (i.e., the signal is relatively constant). Thus, in such embodiments, change between adjacent nodes is limited and extrapolation might degenerate into a linear model. Some embodiments use a smaller S in introduced in such circumstances, and some embodiments use introduced a larger S if the vector field is known or predicted to change more rapidly over space.

$$\bar{\mu}_t \leftarrow \begin{pmatrix} \bar{\mu}_t \\ \hat{m}_{n+1} \end{pmatrix} \tag{32}$$

$$\overline{\sum}_t \leftarrow \begin{pmatrix} \overline{\sum}_t & 0 \\ 0 & M_{n+1} \end{pmatrix} \tag{33}$$

$$\hat{m}_{n+1} = \sum_{i=1}^{n} A_i \hat{m}_i \tag{34}$$

$$M_n = (A_1 \ \ldots \ A_n) M \begin{pmatrix} A_1 \\ \vdots \\ A_n \end{pmatrix} + S \tag{35}$$

Figure 13:
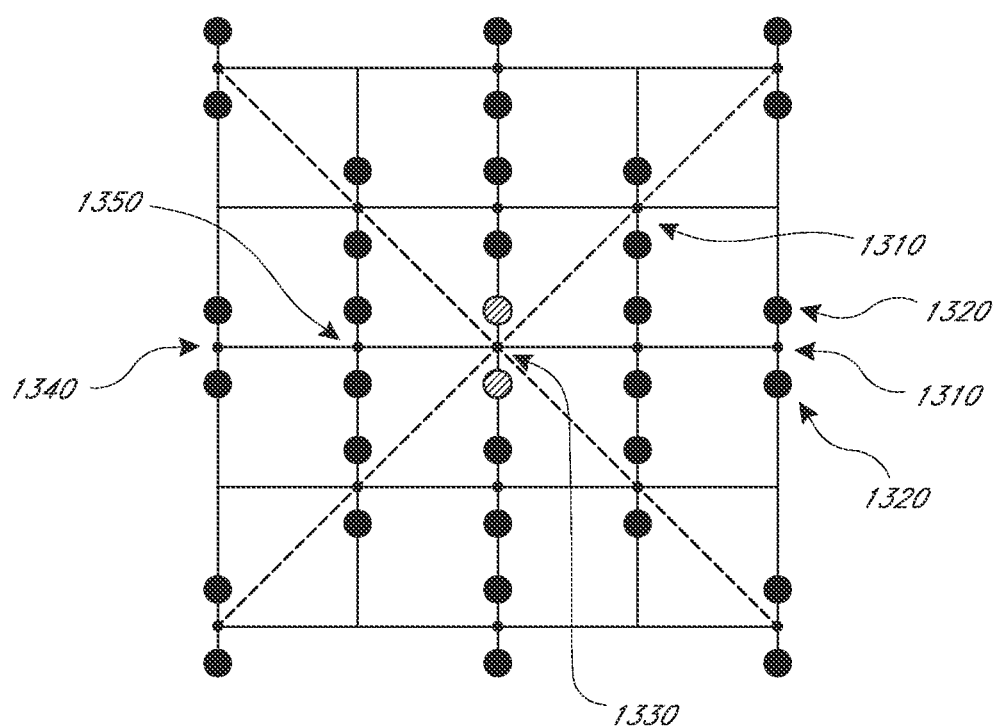
FIG. 13 illustrates an example 8-neighborhood of a node.
Figure 14:
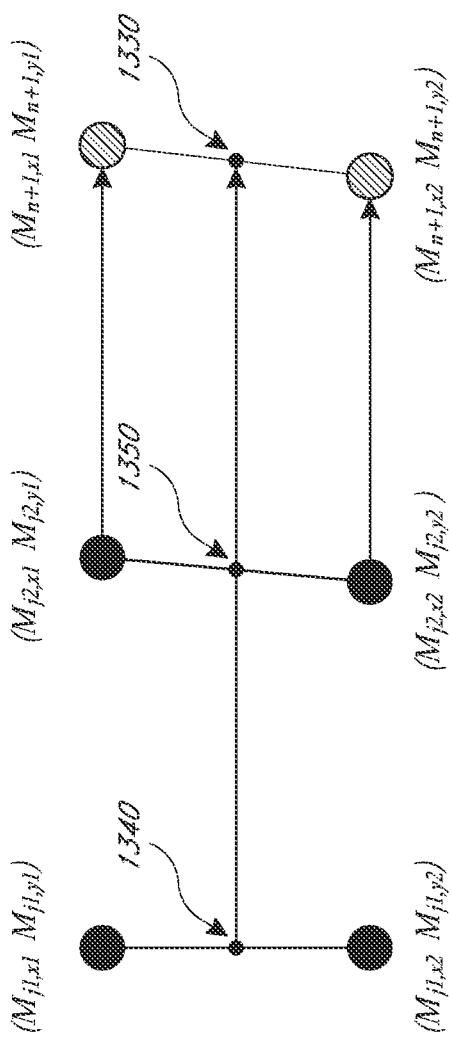
FIG. 14 illustrates an example extrapolation of localization values for a new node from a neighboring pair of nodes.

The initialization of a new node is graphically illustrated in FIGS. 13 and 14. In an embodiment, a new node 1330 is initialized by taking into account the 8-neighborhood directions around the new node 1330, as illustrated in FIG. 13. As shown in FIG. 14, for each of the eight directions, the two neighbors on the straight line from the new node 1330 are used to extrapolate the mean and covariance of the new node. For any such pair the new node can be computed as shown in FIG. 14. The mean and covariance are computed from node $j_1$ 1340 and $j_2$ 1350 only. Both nodes contain the mean estimates of both sensor spots. The corresponding contribution matrices are:

$$A_{j1} = -\frac{1}{2} \begin{pmatrix} 1 & 0 & 1 & 0 \\ 0 & 1 & 0 & 1 \\ 1 & 0 & 1 & 0 \\ 0 & 1 & 0 & 1 \end{pmatrix} \tag{36}$$

$$A_{j2} = -\frac{1}{2} \begin{pmatrix} 3 & 0 & 1 & 0 \\ 0 & 3 & 0 & 1 \\ 1 & 0 & 3 & 0 \\ 0 & 1 & 0 & 3 \end{pmatrix}$$

The extrapolation is such that the mid point between the spots 180 is used for extrapolation. The orientation of the line between the two new spot estimates is taken over from the closer one. This has the effect that changes in orientation are not propagated when initializing new nodes.

Some embodiments optionally only consider cases where a new node can be initialized from a pair of the 8 directions. In case there are several possible candidates, an embodiment may chose the one with the smallest resulting covariance $M_n$. For comparing covariances, the matrix determinant, the trace of the matrix, its Frobenius norm, or other norms can be used.

If there are no neighbors for initialization, some embodiments discard the sensor observation. Such a situation may occur, for example, when the mobile device 100 travels over a full cell without any sensor 170 observations and then arrives in a cell where all four cells are not yet part of the state vector (scenario 3, above). In this scenario, the utility of the new observation for localization may be minimal. Nonetheless, some embodiments may still initialize a new node by linear combinations of other nodes in the state vector using Equations (34) and (35). Some embodiments may optionally only use the motion updates (e.g., the odometry from the dead reckoning sensors 190) of the mobile device 100 and wait until the device 100 returns to an existing cell or to a cell that can be initialized. Another approach is to start over and re-initialize the system from the current pose.

Once the state vector contains elements for all nodes of the current cell, the mean and covariance are updated with the measurement $z_t$ and its covariance $Q_t$ by application of the EKF equations per Equations (37)-(40) where $h(y_t)$ is the sensor model defined in Eq. (18), $H_y$ the Jacobian of the sensor model and K the Kalman gain.

$$\mu_t = \bar{\mu}_t + K(z_t - h(\bar{\mu}_t)) \tag{37}$$

$$\sum_t = (I - K H_y) \overline{\sum}_t \tag{38}$$

$$H_y = \frac{\partial}{\partial y} h(\bar{\mu}_t) \tag{39}$$

$$K = \overline{\sum}_t H_y^T \left( H_y \overline{\sum}_t H_y^T + Q_t \right)^{-1} \tag{40}$$

Figure 15:
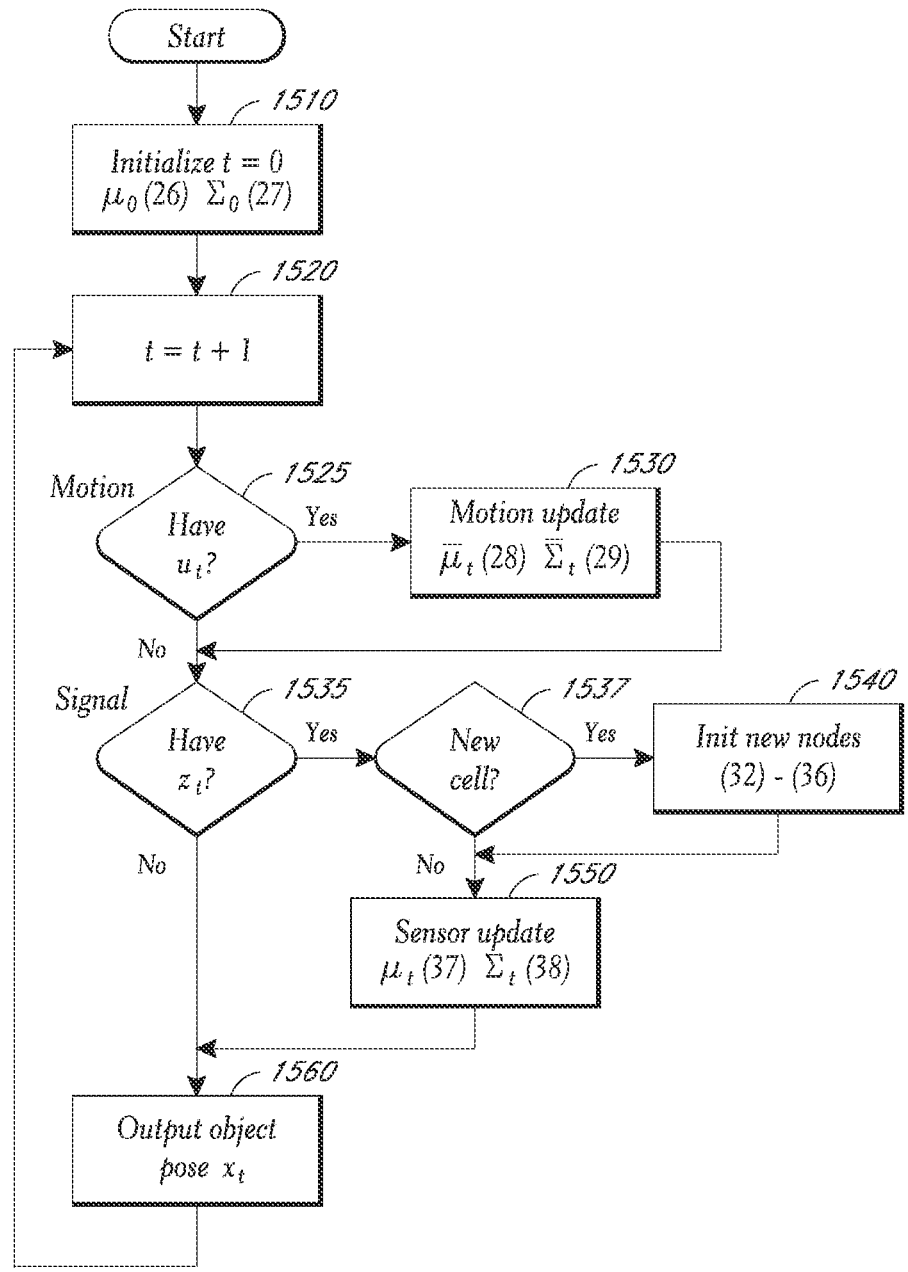
FIG. 15 is a flow chart illustrating an example use of EKF SLAM for localization.

A flow chart of the EKF-SLAM method for object localization is shown in FIG. 15. At state 1510, the initial parameters are set per (26) and (27). At the next time interval, if there is a motion update such as from the dead reckoning sensors 190 then it is applied at state 1530 per (28) and (29). If there is a value from the signal sensor 170, and if a new cell is needed, it is initialized at state 1540 per (32)-(36). After it is initialized, or if no new cell was needed, then a sensor update is performed at state 1550 per (37) and (38). After any necessary updates, a new pose is output at state 1560 and the process continues with the next time period.

In general, EKF-SLAM has the advantage that it is an on-line method, integrating motion/odometry and signal sensor measurements as they appear. The most computationally expensive operation is the update of the covariance matrix on sensor update in Eq. (38), state 1550. This involves the update of large numbers (e.g., all) of the matrix elements, an operation that takes time quadratic in the number of nodes in the state.

In general, the covariance $\Sigma_t$ is fully correlated. That is, there are few, if any, elements that are zero. This typically requires holding the full matrix in a data memory, which may limit the applicability of the method for embedded systems or other environments if there are overly limited memory resources.

An additional step in the EKF as well as in other filters is outlier rejection. In the case where measurements are received that seem implausible, the filter rejects these measurements. This may be accomplished by not updating the filter on such measurements, which may be the result of hardware errors, signal interference, or irregular timing problems, for example.

There are several options for detecting such outliers. For example, the sensor measurement itself can be examined for valid data. By way of illustration, a threshold on the absolute magnitude of the signal strength reported by a sensor if the range of allowable magnitudes for the signal being detected is known. If the measurement falls below or above this threshold it is rejected.

Another way to detect outliers is by comparing the received measurement $z_t$ with the expected one $h(\overline{\mu}_t)$. If the difference (e.g., as reported by means of the Mahanalobis distance, which is based on correlations between variables via which different patterns can be identified and analyzed) is too large, the measurement is rejected.

Another approach used by some embodiments for state estimation is an Extended Information Filter (EIF). The EIF is similar to the Extended Kalman Filter in that it models a Gaussian distribution over the state space and processes motion and signal sensor data on-line. Its parameterization, often called a dual representation, differs from that used by EKF. The parameterization consists of an information vector $\eta_t$ and an information matrix $\Lambda_t$ that are related to the mean $\mu_t$ and covariance $\Sigma_t$ of the EKF in the following way:

$$\eta_t = \Sigma_t^{-1} \mu_t$$

$$\Lambda_t = \Sigma_t^{-1} \quad (41)$$

The EIF-SLAM algorithm processes data from the motion sensors 190 and signal sensors 170 in the same way as EKF-SLAM described above. The computation of information vector and information matrix on object motion and sensor measurement can be derived from Eqs. (26) to (40) by inserting Eq. (41) and simplifying the resulting equations.

In general a direct application of the EIF-SLAM algorithm does not provide a greater advantage than EKF-SLAM. Under some approximations, however, it is possible to keep the information matrix sparse, i.e. many elements are zero, allowing for a more compact storage and more efficient updates in terms of time and computational resources.

EIF-SLAM has the property that when inserting a signal sensor 170 measurement, only those elements in the state the measurement depends on need to be updated in the information matrix. For Vector Field SLAM this means that only elements related with the device 100's object pose and rotational variability and with the four nodes of the current cell are updated. All other elements in the information matrix stay unchanged. Therefore, the update on signal sensor 170 information turns only few elements from zero into non-zero and generally preserves the sparsity of the information matrix.

However, the update on device motion (e.g., when new data from the motion sensors 190 is received) causes a full update of the whole information matrix in the general case. This causes the information matrix to become non-zero in most if not all elements, which may destroy any sparsity that was present before the motion update.

Some embodiments may use strategies for approximating the update of the information matrix on device motion that preserve the sparsity of the information matrix. Two such methods are the Sparse Extended Information Filter (SEIF) and the Exactly Sparse Extended Information Filter (ES-EIF).

Yet another approach available to some embodiments for state estimation is ESEIF. The principle of the ESEIF algorithm is maintaining a set of "active features". In the original context, "features" refer to landmarks. In the case of Vector Field SLAM, the features are the nodes. The active features are a subset of all features. Typically those features that are currently observed by the mobile device 100 are the active ones. Other features are called "passive".

Only the active features contain cross-information between the pose of the device 100 and the feature (where the cross-information between device pose and feature is non-zero for active features, whereas for passive features this cross-information is zero). A feature can change its state from passive to active at any time without the need of special operations. The cross-information between device pose and feature starts as zero and becomes non-zero when updating the system on device motion.

Changing an active feature to a passive one requires computationally non-trivial operations that approximate the actual information matrix by a sparsification. ESEIF-SLAM conceptually integrates out the device pose and then re-localizes the device 100 using observations from only those features (nodes) that should stay or become active. By integrating out the device pose, the state becomes free of the pose. Any uncertainty in the device pose is moved into the feature estimates through the cross-information between device pose and feature. When re-localizing the device 100, only the features used in the signal sensor 170 observation then establish non-zero cross information. This way the sparseness of the information matrix is preserved.

Figure 16:
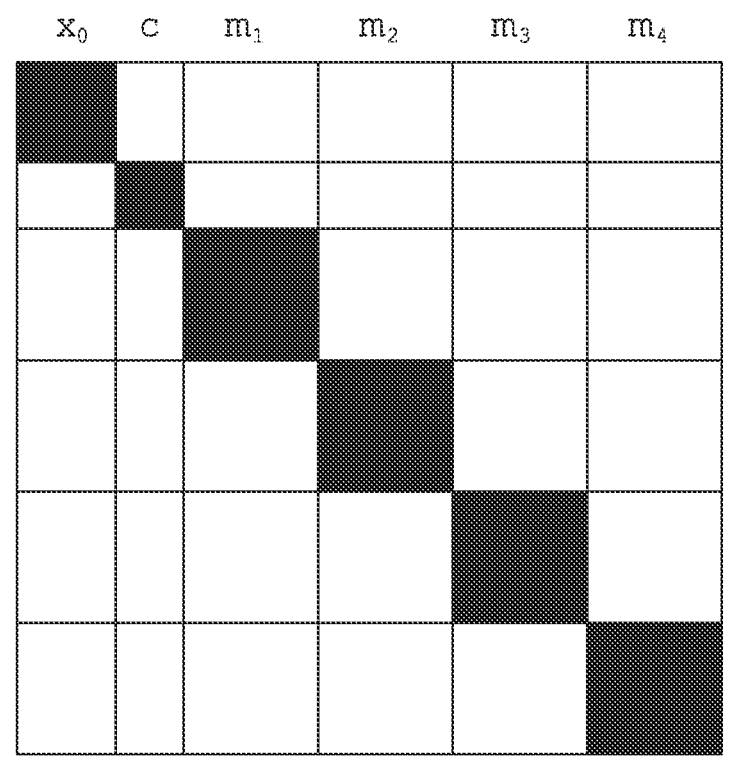

The following describes an implementation of the ESEIF algorithm in the context of Vector Field SLAM. FIGS. 16-22 show information matrices supporting this description. Initially the system starts with 4 nodes, as in Equation (23). The corresponding information matrix is shown in FIG. 16. Only the diagonal blocks in the information matrix contain information and are non-zero, as indicated by black solid squares. All other entries are zero (shown as white). The diagonal blocks refer to the device pose $x_t$, the rotational variability c and the initial 4 nodes $m_1 \ldots m_4$.

Figure 17:
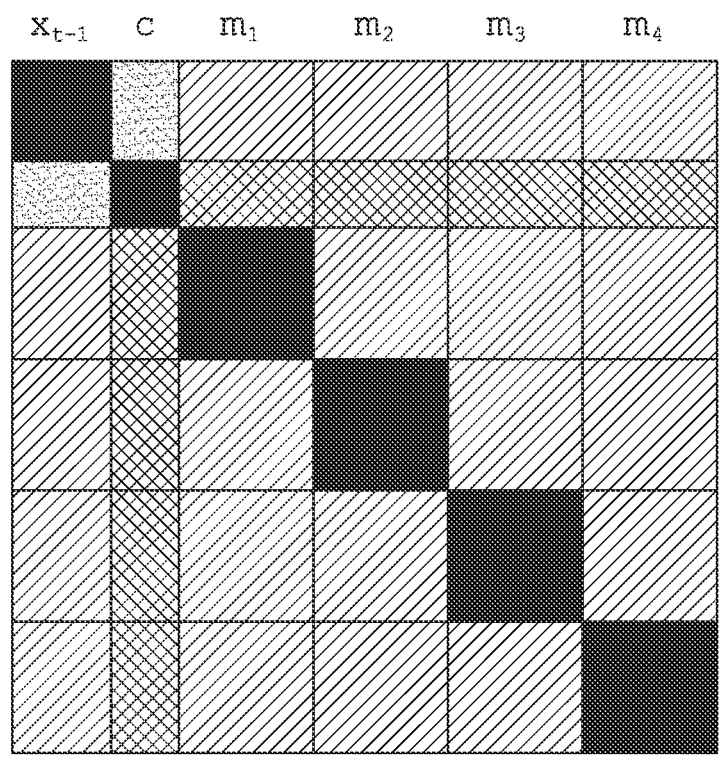

In an example embodiment, as long as the object stays within this initial cell, the system updates the complete information matrix using all 4 nodes as active features. Eventually the matrix becomes fully dense (most if not all elements become non-zero), as illustrated in FIG. 17.

Figure 18:
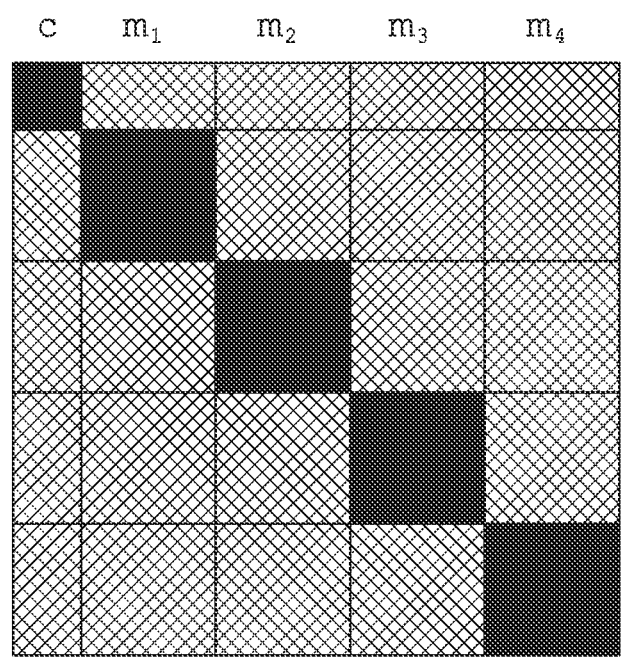

When the mobile device 100 moves out of the current cell and enters a different cell, the procedure of integrating out the device pose, initializing new nodes, and re-localizing the device takes place. First, the uncertainty of the device pose is integrated out. This moves information from the object pose into the rotational variability and the 4 nodes through their cross information. The result is an information matrix as shown in FIG. 18, which usually contains stronger information between nodes than before and lacks a device pose.

Figure 19:
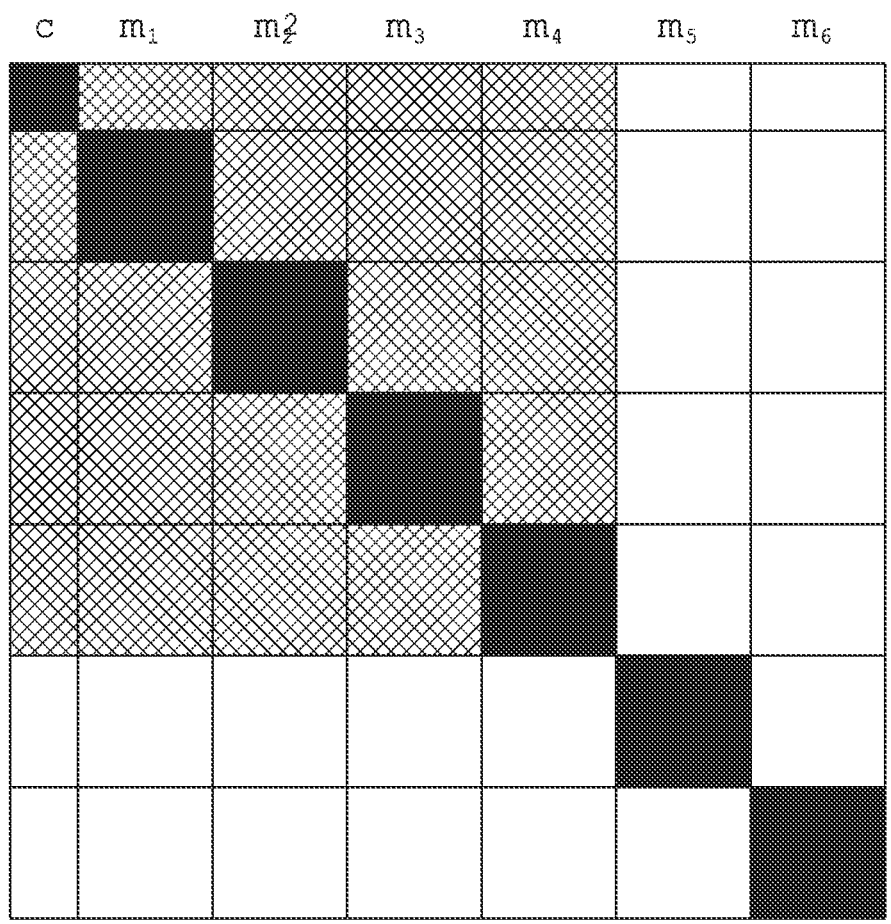

Next, new nodes are initialized and added to the state. For example, two new nodes $m_5$ and $m_6$ may be added as shown in FIG. 19. This indicates that the device 100 moved into a neighboring cell sharing nodes $m_3$ and $m_4$ with the initial one. The processing necessary for the addition of these nodes is described below. Note that the description also applies for other situations where 1, 3, or 4 new nodes need to be added, or, in embodiments that use cells with greater than four nodes, more than four new nodes need to be added.

The initial values for the information vector and matrix are obtained similarly to Equations (32)-(36), but in the information form as set out in Equation (41). The new information matrix then becomes the one as shown in FIG. 19. Note that there is no cross information between the new nodes and other entries in the state.

The pose of the device 100 is then reintroduced. In the original ESEIF algorithm, an object is localized through observations of active features. In this application of Vector Field SLAM algorithm this is performed in two steps. First, the state is augmented with the new device pose as shown in FIG. 19.

The entries for the new device pose in information vector and matrix are computed using Equation (41) and the following mean and covariance per Equations (42) and (43), where $R_0$ is a parameter that increases the uncertainty of the new device pose. Thus, the new device pose stays unchanged but becomes less certain. At this time there are no active nodes since all cross information between device pose and nodes are zero. Any four nodes can be chosen as the next active set of features. Since the device 100 is in the cell defined by nodes $m_3 \ldots m_6$, those nodes are chosen as the next set of active features.

$$\mu_t = \mu_{t-1} \qquad (42)$$

$$\Sigma_t = \Sigma_{t-1} + R_0 \qquad (43)$$

Figure 21:
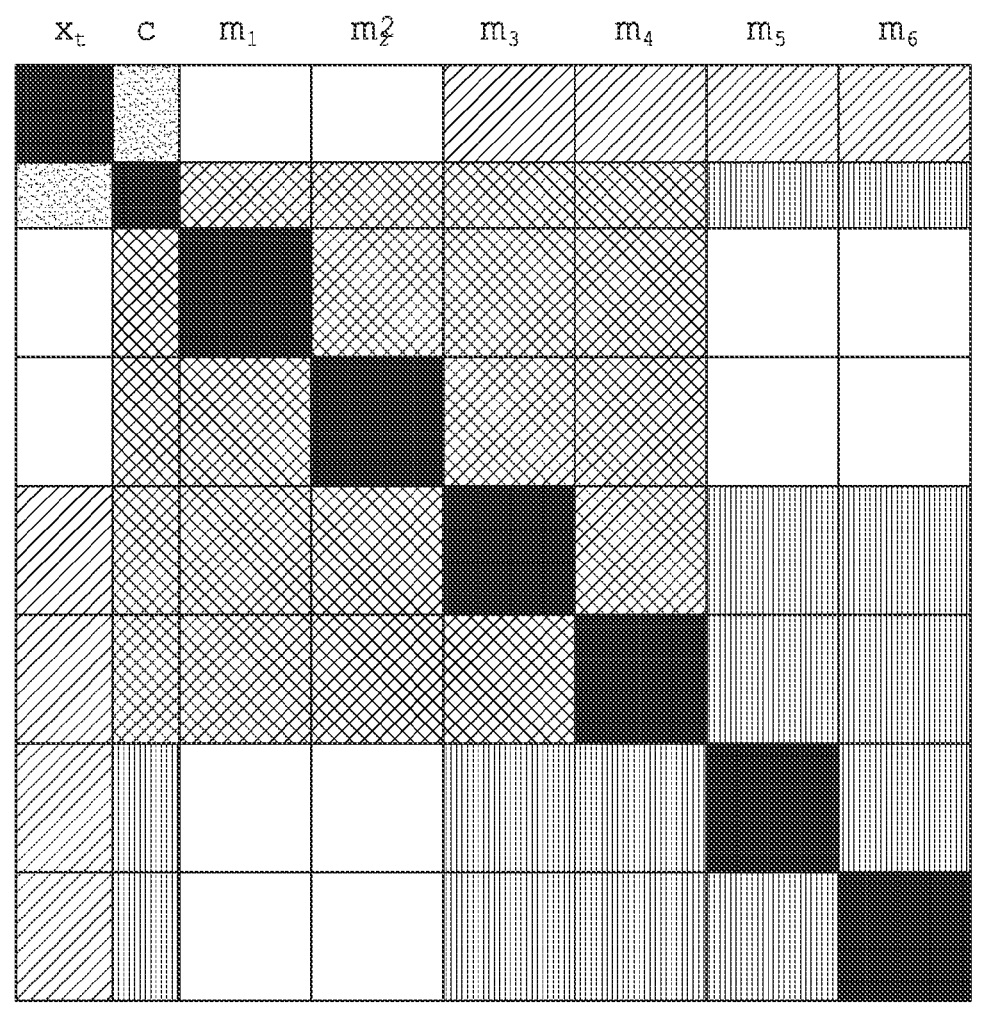

On signal sensor measurement $z_t$, the uncertainty of the device pose is reduced and elements related to rotational variability and the four active nodes $m_3 \ldots m_6$ are updated. This creates new cross-information between device pose, rotational variability, and active nodes as shown in FIG. 21. Note that there is no cross information between nodes $m_1$, $m_2$ and nodes $m_6$, $m_6$. This shows how the information matrix stays sparse.

As the device 100 moves within the current cell, in this example embodiment optionally only the device pose, rotational variability, and active cells $m_3 \ldots m_6$ are updated, as was noted during the discussion of the initial situation. When the device 100 moves into another cell, the state is extended and the information vector and matrix are augmented with new nodes as described above. If the new cell has been visited before, no new nodes need to be added to the state. In either case, the same procedure of integrating out device pose followed by re-localization takes place.

Figure 22:
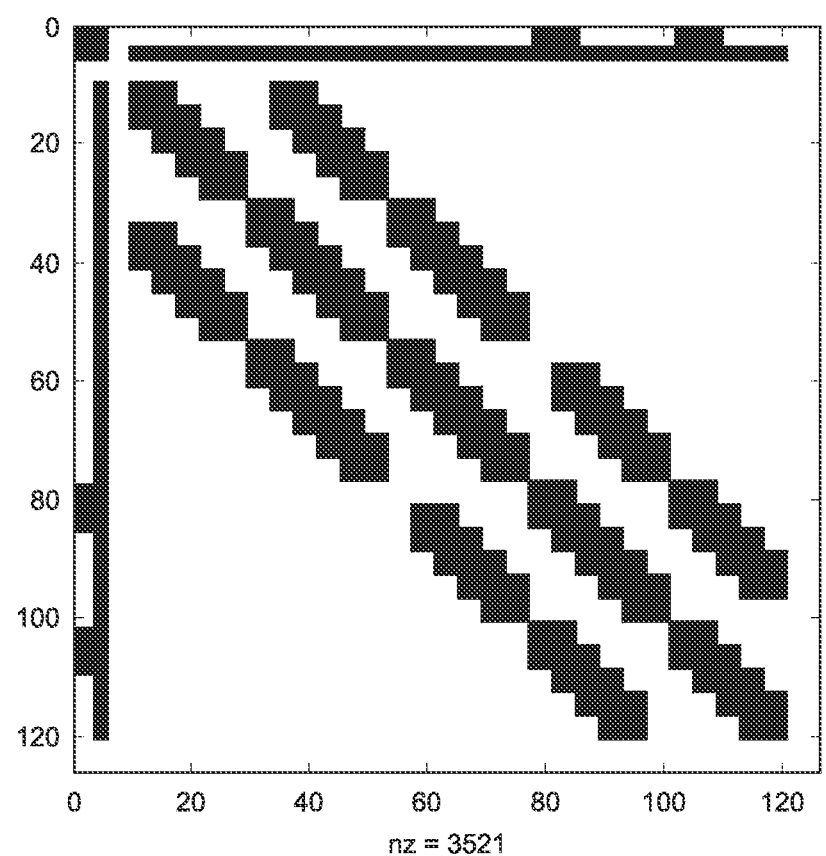

FIG. 22 shows the information matrix after a longer run of the system configured as described. The state contains a total of 29 nodes. The device pose $(x, y, \theta)^T$ consists of three variables, rotational variability $(c_x, c_y)^T$ consists of two variables, and each node $(m_{i,x1}, m_{i,y1}, m_{i,x2}, m_{i,y2})^T$ consists of four variables. This leads to a total of $3+2+4*29=121$ variables. Non-zero information is indicated by solid blocks whereas white areas are zero information. The device pose contains cross information to the currently active nodes only (around rows 80 and 110). On the other hand, rotational variability contains cross information to all nodes. The nodes themselves have cross-information to spatially neighboring cells, which are at most eight neighbors per node. Overall the matrix is significantly sparse. From the $121 \times 121 = 14641$ entries in the information matrix, only 3521 or approximately 24% are non-zero. Furthermore since the matrix is symmetric, only the upper or lower half needs to be stored. This allows for compact storage and efficient computation within the ESEIF-SLAM algorithm—an efficient use of computational resources.

The mathematical equations for motion update (e.g., from the dead reckoning motion sensors 190), signal sensor update (e.g., from the sensors 170), and sparsification can be formulated directly in the information space, i.e. only using $\eta$ and $\Lambda$ for storing the state between motion and sensor updates. In addition an estimate of the mean $\mu$ is needed for computing the Jacobians of motion and sensor model.

Figure 23:
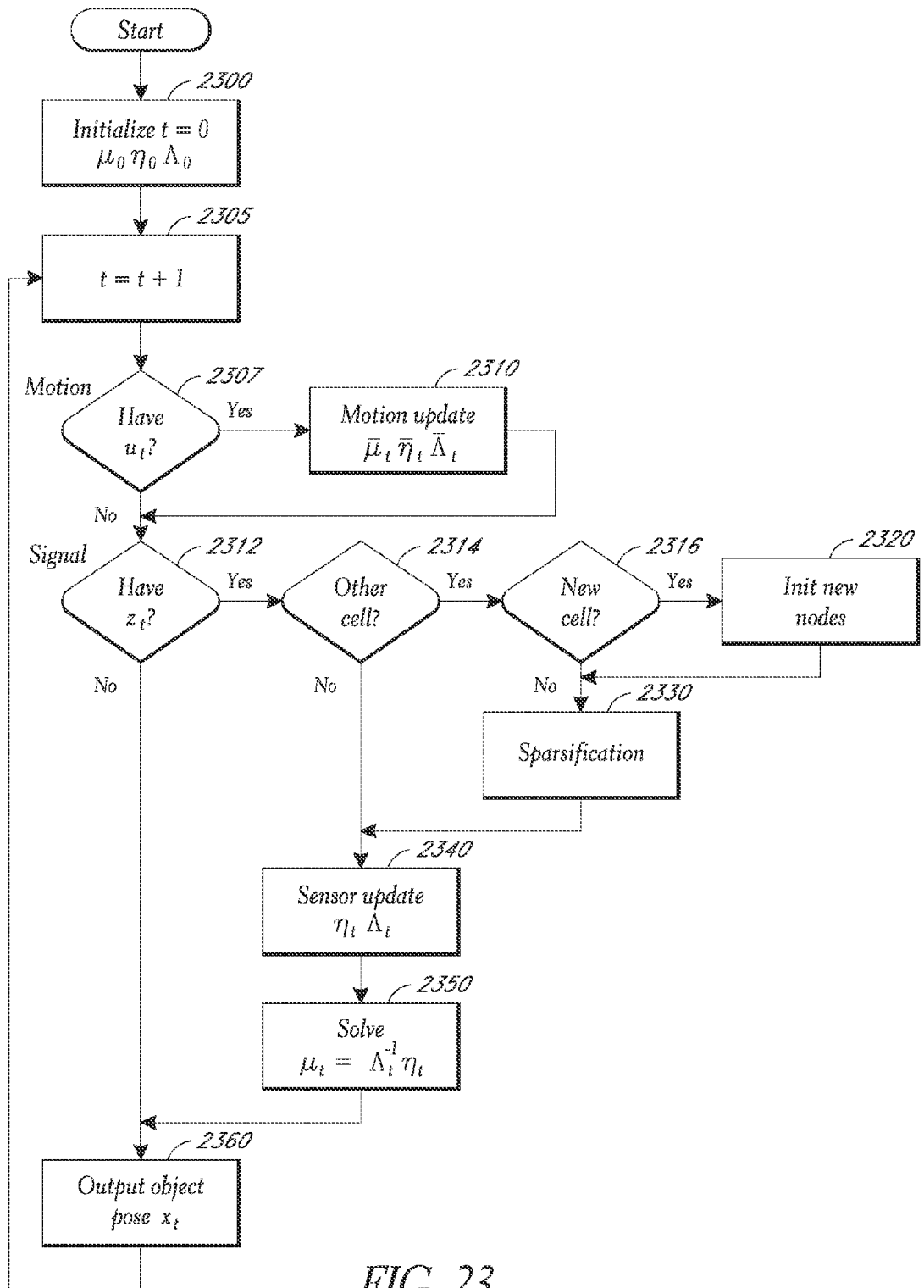
FIG. 23 is a flow chart illustrating an example use of ESEIF-SLAM for localization.

A flow chart of an example implementation of the ESEIF-SLAM algorithm for object localization is shown in FIG. 23. It is similar to the EKF-SLAM algorithm, with an initialization state 2300, a motion update state 2310 if there is new motion (odometry) data, a signal update state 2340 if there is new signal sensor data, preceded by a new-node initialization state 2320 if new nodes are added, but also with an additional sparsification state 2330 that integrates out device pose and re-localizes the device 100 when changing to another cell. Also, there is another state 2350 for recovering the current mean $\mu_t$ from the information space by solving an equation system. After the solving state 2350, a new device pose is produced at state 2360 and the process repeats. This flow chart, like those illustrating the other algorithms, is illustrative. One of ordinary skill will make use of available optimizations when implementing an algorithm, including these algorithms.

The state vector as defined in (20) and (21) only contains one field for rotational variability. This is under the assumption that rotational variability does not change with location and thus can be shared among all nodes. There are, however, situations where this is not the case, e.g. when the error $\beta_\epsilon$ in Equation (5) is significant and the approximations in Equations (7)-(9) introduce a larger error, or when the sensor 170 is tilted due to uneven floor. There are different ways to deal with changing rotational variability.

In one embodiment each node contains its own estimate of rotational variability. The state vector of full SLAM in Equation (20) containing the full object path changes into Equation (44), with similar changes for the state of on-line SLAM in Equation 21.

$$y = \begin{pmatrix} x_1 \\ \vdots \\ x_T \\ m_1 \\ c_1 \\ \vdots \\ m_N \\ c_N \end{pmatrix} \qquad (44)$$

The rotational variability is computed similar to the expected node values by using bilinear interpolation per Equation (45), where $c_{i0}$, $c_{i1}$, $c_{i2}$ and $c_{i3}$ are the rotational variability estimates at the four cell nodes according to FIG. 11 and $w_0$, $w_1$, $w_2$ and $w_3$ are the weights from Equation 17. Using the obtained value for c the predicted measurement is computed as before using Equation 18.

$$c = w_0 c_{i0} + w_1 c_{i1} + w_2 c_{i2} + w_3 c_{i3} \qquad (45)$$

Initial estimates of rotational variability are 0 with a co-variance of total uncertainty. When initializing new nodes, the same techniques as described for initial mean and covariance of the node signal values apply for rotational variability.

The cost of storing rotational variability with each node is an increase in the number of state variables and therefore higher memory and run-time consumption. This can limit the application of this solution when computational resources are constrained.

In another embodiment, only one instance of rotational variability is kept, as originally defined in Equations (20) and (21), but it is allowed to change when the mobile device 100 moves. For EKF-SLAM this means that in the motion model in Equations (28)-(30), a component $V_t$ is added to the sub-matrix of the rotational variability in the state covariance. $V_t$ is an additive co-variance matrix modeling how much rotational variability is allowed to change when moving. It is usually a diagonal matrix of constant values.

In another embodiment, $V_t=0$ as long as the device 100 stays within a cell and $V_t$ is set to a diagonal matrix with constant non-zero values on the diagonal only when the device 100 changes between cells. This has the advantage that while the device 100 stays within a cell, rotational variability is assumed to be constant and is only allowed to change when moving into another cell. In some situations this may offer a better approximation at the cost of additional computation time, but requires no significant additional computational space.

In another embodiment, $V_t$ is used to allow a change in rotational variability when moving between cells in the ESEIF-SLAM system. In the sparsification state, the rotational variability is integrated out and re-localized as the device pose is. This is done because adding $V_t$ in the information space would otherwise fully populate the information matrix, destroying or reducing its sparseness. The states for sparsification with rotational variability included are analogous to the previously described method. An additional advantage of this approach is the removal of cross-information between rotational variability and passive nodes. This further reduces memory requirements and saves computations, at least partially counteracting the additional computation necessary to perform the calculations.

These methods and systems may also be used for detecting and estimating "drift" on, for example, carpet. When a mobile device 100 moves on a carpeted surface, the carpet exhibits a force onto the mobile device 100 tending to slide or shift the mobile device 100 in a certain direction. This effect is caused by the directional grain, material, or other properties of the carpet. Other surfaces, such as lawns or artificial turf, may also exhibit similar properties.

The amount of this drift can be estimated by the localization filter in different ways. In one embodiment, the filter state in Equation (24) is augmented by two additional variables $drift_x$ and $drift_y$ that represent the amount of carpet drift in the x and y direction of the global coordinate frame. The motion model in Equation (11) then takes into account these new parameters and the filter estimates their values at the same time it estimates the other state variables.

In another embodiment, the mobile device 100 may be configured to move a certain distance forward followed by the same distance backward. From the difference in the position output of the localization system at the beginning and end of this sequence, the amount of carpet drift can be estimated because the carpet drift may be proportional to this position difference. Typically, such a distance would be small enough that it can be traversed rapidly but large enough that an appreciable difference can be detected and the results not obfuscated by noise. Some embodiments may use distances in the range of 10 cm to 2 meters. Some embodiments may use smaller distances. Some embodiments may use larger distances.

The systems and methods described above were evaluated by moving an indoor localization sensor 170, configured to detect infrared patterns 180 projected from a beacon 160, along a rail. Ground truth information—the actual pose of the sensor 170—was directly available from position and orientation sensors on the rail motor. Every 50 cm, sensed signal strength and other measurements were recorded with the sensor 170 in 8 different directions (every 45°), and approximately 50 readings were taken for each of those directions. Once the sensor 170 reached the end of the rail, it was moved 50 cm parallel to the previous rail line and another round of measurements was taken. This was repeated until a total of eight parallel tracks were completed. The previously discussed FIG. 9 shows the experimental setup with the ground truth positions of measurements. There is a wall 135 close to the rail at the top location. There are also walls on the left 120 and right 130 of the experimental space, but those walls are further from the sensor 170 than the upper wall 135 (at least when the sensor 170 is traversing the final rail. These walls contribute to multi-path signals and cause a significant disturbance of the sensor signal.

The previously discussed FIG. 10 shows the position of the sensor 170 directly determined by a linear sensor model in this environment. The compression on the left, right and top end is significant: a system using this linear model would loose significant accuracy in pose estimation.

Figure 24:
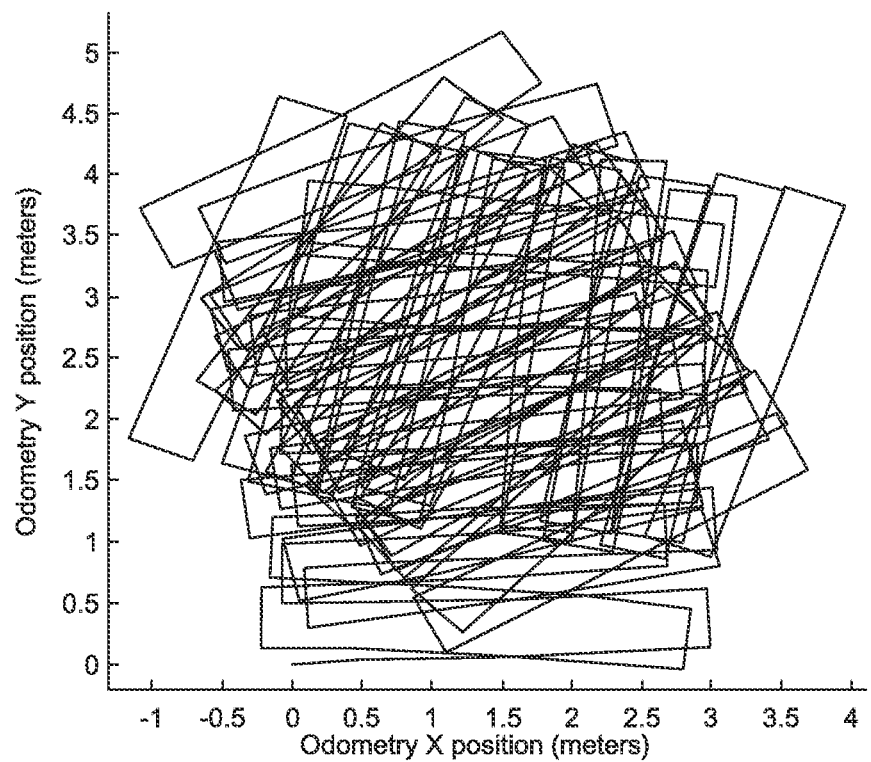
FIG. 24 illustrates example results of using odometry (dead-reckoning) alone to follow a navigational plan.

Using the recorded data, a path for a virtual mobile device 100 through the grid was generated. Starting in the lower left corner the object moves along the rows and changes between rows on the left and right side. This results in a theoretically straightforward motion: along a row, a 90° turn at the end of the row, a brief movement to reach the next row, and then another 90° turn before traversing that next row. In practice, when zero-mean Gaussian noise is added to the motion information (simulating real-world error after extended use of dead-reckoning sensors), the odometry path is obtained as shown in FIG. 24. After attempting to move up and down the rail grid approximately ten times, the error in orientation is up to 90°: the mobile device is actually moving vertically when its own reckoning system indicates it is moving horizontally.

The simulated relative pose data and the resulting odometry path are plausible examples of internal motion estimates. Mobile devices such as autonomous vacuum cleaners or other consumer products can show a similar degradation of pose estimation when using the integration of wheel encoder counts as the only method for pose estimation for example.

Figure 25:
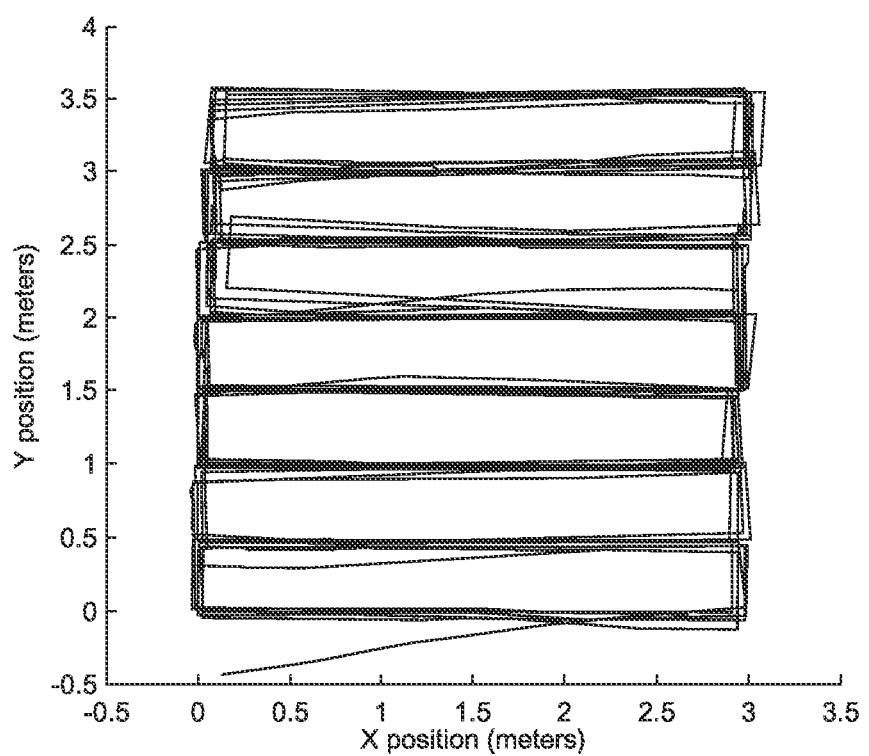
FIG. 25 illustrates example results of using an example embodiment of background signal localization to follow a navigational plan.

For testing the Vector Field SLAM system, one of the approximately 50 sensor measurements from the ground truth pose was randomly chosen when reaching a grid position. This measurement was then provided to the SLAM method for object localization. The cell size for Vector Field SLAM was set to 1×1 meters. FIG. 25 shows the resulting object path. Although the figures speak for themselves, the conclusion is that a mobile device 100 equipped with a localization and mapping system as disclosed herein, can following a navigational plan with a dramatically higher degree of accuracy than one relying on dead reckoning alone. This result was computed using an implementation of EKF-SLAM. Similar results were obtained using GraphSLAM and ESEIF-SLAM implementations.

In another series of experiments, the accuracy of the individual Vector Field SLAM implementations was compared to ground truth. In general, all three methods provide higher accuracy than other methods that only use linear sensor models. The GraphSLAM method usually provided slightly better accuracy than EKF-SLAM and ESEIF-SLAM. The latter two usually provided similar accuracy. The absolute position error was determined to depend on several factors such as ceiling height and the size of environments. In the test environment, the overall mean position error was about 6 cm. In general, the sources of error may vary depending on the signal sources 180 used. For example, ceiling height may not be a significant contributor to error if the background signal used is generated by magnetic coils suspended over the operating environment.

Figure 26:
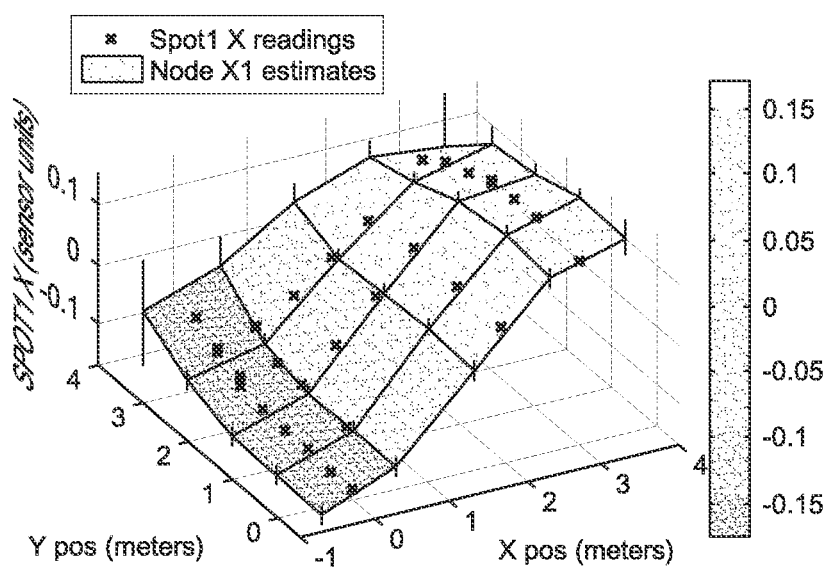
FIGS. 26 and 27 illustrate example signal strength maps generated by an embodiment.
Figure 27:
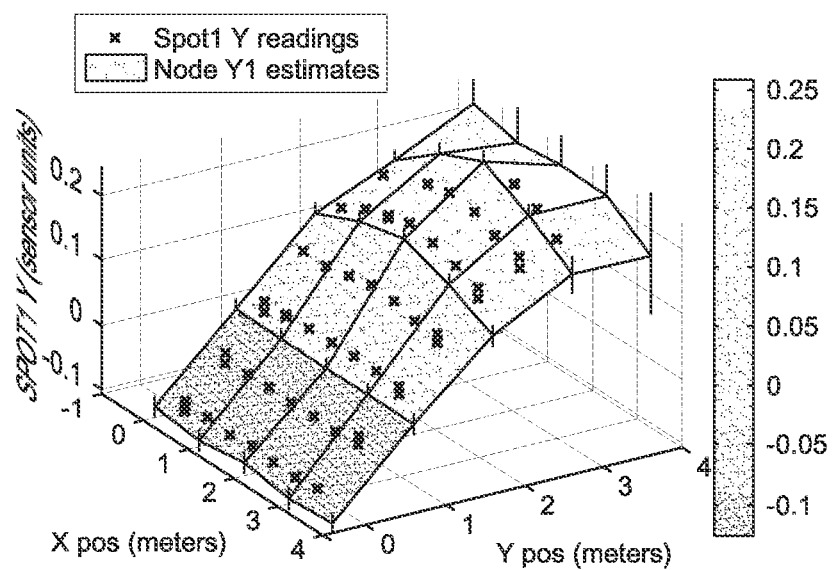

Vector Field SLAM also provides information about the learned sensor model or map—the signal strength through the environment. FIGS. 26 and 27 show the learned coordinates for a signal source, in this example an infrared pattern 801 (the plots for a second infrared pattern or spot 802 are similar and omitted). Error bars indicate the 2 sigma levels of the mean values at each node position. One can see how the sensor signal is bent towards the rear wall 135. This shape is accounted for by the piece-wise approximation of the sensor signal.

A typical embodiment will run asynchronously in that a new time step is considered to occur whenever new data is available from signal sensor 170. This may be as often as six or seven times a second. In some embodiments, new sensor data may be ignored if the embodiment is still integrating previously available data and generating new pose information. In some embodiments the localization processor may request data from the signal sensor 170 or otherwise indicate that it is available to process that data. Some embodiments may run synchronously, with new data provided at fixed and regular time intervals.

The systems and methods disclosed herein can be implemented in hardware, software, firmware, or a combination thereof. Software can include compute readable instructions stored in memory (e.g., non-transitory memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof.

While certain embodiments may be illustrated or discussed as having certain example components, additional, fewer, or different components may be used. Further, with respect to the processes discussed herein, various states may be performed in a different order, not all states are required to be reached, and fewer, additional, or different states may be utilized.

Various aspects and advantages of the embodiments have been described where appropriate. It is to be understood that not necessarily all such aspects or advantages may be achieved in accordance with any particular embodiment. Thus, for example, it should be recognized that the various embodiments may be carried out in a manner that achieves or optimizes one advantage or group of advantages as taught herein without necessarily achieving other aspects or advantages as may be taught or suggested herein. Further, embodiments may include several novel features, no single one of which is solely responsible for the embodiment's desirable attributes or which is essential to practicing the systems, devices, methods, and techniques described herein.

What is claimed is:

1. A robot configured to determine its location and orientation in an environment in which a signal, external to the robot, is present, the robot comprising:
   a signal sensor configured to detect a property of the signal;
   a movement system configured to move the robot from a first pose comprising a first location in the environment at a first time to a second pose comprising a second location at a second time, the second location proximate to the first location;
   a motion sensor configured to detect a change in location between the first pose and the second pose;
   a local signal estimator configured to predict the value of the signal property at a plurality of poses, the plurality of poses comprising poses with respective predefined locations proximate to the first pose; and
   a localization component configured to estimate the robot's second pose based at least in part on a value of the signal property as detected by the signal sensor at the second pose, the change in pose between the first pose and the second pose as detected by the motion sensor, and a predicted value of the signal property at the estimated second pose based at least in part on one or more of the values predicted by the local signal estimator.

2. The robot of claim 1, wherein the motion sensor is configured to detect the change in location between the first pose and the second pose by detecting a relative change in location.

3. The robot of claim 1, wherein two locations are proximate only if they are less than 2 meters apart.

4. The robot of claim 3, wherein two locations are proximate only if they are less than 2 feet apart.

5. The robot of claim 1, wherein:
   the movement system is further configured to move the robot from the second location at the second time to a third pose comprising a third location in the environment at a third time, the third location not proximate to the first location;
   the motion sensor is further configured to detect a change in location between the second location and the third location;
   the local signal estimator is further configured to predict values of the signal property at a plurality of locations proximate to the third location based, at least in part, on extrapolating from previously predicted values at one or more locations proximate to both the first location and the third location; and
   the localization component is further configured to estimate the robot's third location based at least in part on a value of the signal property as detected by the signal sensor at the third location, the change in location between the second location and the third location as detected by the motion sensor, and a value of the signal property at the estimated third location as predicted by the local signal estimator.

6. The robot of claim 5, wherein the local signal estimator is further configured to introduce noise into the extrapolation.

7. The robot of claim 1, wherein the motion sensor is further configured to detect a relative change in orientation between the first pose and the second pose.

8. The robot of claim 7, wherein the localization component is further configured to estimate the robot's second pose based at least in part on a rotational variance measure associated with how the value of the signal property detected by the signal sensor depends on the orientation of the robot.

9. The robot of claim 1, wherein the local signal estimator is further configured to detect and reject outliers of the predicted values of the signal property.

10. The robot of claim 1, wherein the estimated second pose is based at least in part on a calibration parameter of at least one of the signal sensor and the motion sensor.

11. An autonomous robot comprising:
- a movement system configured to move the robot within an environment from a first pose to a second pose and from the second pose to a third pose, the first pose comprising a first location in the environment at a first time, the second pose comprising a second location at a second time, and the third pose comprising a third location at a third time, wherein the second location is proximate to the first location and the third location is not proximate to the first location;
- a signal sensor configured to be responsive to a property of a signal in the environment;
- a motion sensor configured to detect a change in location between the first pose and the second pose, and to detect a change in location between the second pose and the third pose;
- a local signal estimator configured to predict values of the signal property at a plurality of locations proximate to the first location and to predict values of the signal property at a plurality of locations proximate to the third location, the values at the plurality of locations proximate to the third location being based, at least in part, on extrapolating from previously predicted values at one or more locations proximate to both the first location and the third location; and
- a localization component configured to:
  - estimate the second location of the robot based at least in part on a value of the signal property as detected by the signal sensor at the second location, the change in location between the first pose and the second pose as detected by the motion sensor, and a predicted value of the signal property at the estimated second location as predicted by the local signal estimator, and to
  - estimate the third location of the robot based at least in part on a value of the signal property as detected by the signal sensor at the third location, the change in location between the second pose and the third pose as detected by the motion sensor, and a predicted value of the signal property at the estimated third location as predicted by the local signal estimator.

12. The robot of claim 11, wherein the localization component is further configured to estimate at least one of the second pose and the third pose based at least in part on a rotational variance measure associated with how the value of the signal property detected by the signal sensor depends on an orientation of the robot.

13. The robot of claim 11, wherein the localization component is further configured to estimate at least one of the second pose and the third pose based at least in part on a calibration parameter of at least one of the signal sensor and the motion sensor.

14. The robot of claim 11, wherein the first and third locations are not proximate in that they are greater than 2 meters apart.

15. The robot of claim 11, wherein the local signal estimator is further configured to introduce noise into the extrapolation.

16. The robot of claim 11, wherein the motion sensor is further configured to detect a relative change in orientation between the first pose and the second pose and between the second pose and the third pose.

17. The robot of claim 11, wherein the localization component is further configured to revise the second pose by applying a SLAM implementation to at least the estimated second location, the predicted value of the signal property at the estimated second location, and the value of the signal property at the estimated second location.

18. The robot of claim 11, wherein the localization component is further configured to revise the third pose by applying a SLAM implementation to at least the estimated third location, the predicted value of the signal property at the estimated third location, and the value of the signal property at the estimated third location.

19. The robot of claim 11, wherein the local signal estimator is further configured to detect and reject outliers of the predicted values of the signal property.

20. The robot of claim 11, wherein at least one of the estimated second location and the estimated third location is based at least in part on a calibration parameter of at least one of the signal sensor and the motion sensor.

* * * * *

UNITED STATES PATENT AND TRADEMARK OFFICE
CERTIFICATE OF CORRECTION

PATENT NO. : 9,440,354 B2
APPLICATION NO. : 14/589429
DATED : September 13, 2016
INVENTOR(S) : Steffen Gutmann et al.

Page 1 of 1

It is certified that error appears in the above-identified patent and that said Letters Patent is hereby corrected as shown below:

In the Specification

Column 1, Line 7, delete "continuation of" and insert, -- divisional of -- therefore.

Signed and Sealed this
Seventh Day of March, 2017

Michelle K. Lee
*Director of the United States Patent and Trademark Office*